US012692440B2

(12) United States Patent
Iizuka et al.

(10) Patent No.: US 12,692,440 B2
(45) Date of Patent: Jul. 28, 2026

(54) LIQUID CRYSTAL ALIGNING AGENT, LIQUID CRYSTAL ALIGNMENT FILM AND LIQUID CRYSTAL DISPLAY ELEMENT

(71) Applicant: NISSAN CHEMICAL CORPORATION, Tokyo (JP)

(72) Inventors: Yuta Iizuka, Funabashi (JP); Masato Moriuchi, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/867,267

(22) PCT Filed: May 19, 2023

(86) PCT No.: PCT/JP2023/018712

§ 371 (c)(1),
(2) Date: Nov. 19, 2024

(87) PCT Pub. No.: WO2023/224114

PCT Pub. Date: Nov. 23, 2023

(65) Prior Publication Data

US 2025/0257265 A1 Aug. 14, 2025

(30) Foreign Application Priority Data

May 20, 2022 (JP) ................................ 2022-083143

(51) Int. Cl.
*C09K 19/30* (2006.01)
*C09K 19/06* (2006.01)
*C09K 19/34* (2006.01)

(52) U.S. Cl.
CPC ........ *C09K 19/3003* (2013.01); *C09K 19/066* (2013.01); *C09K 19/3411* (2013.01); *C09K 2019/3004* (2013.01); *C09K 2019/3009* (2013.01); *C09K 2019/3408* (2013.01); *C09K 2019/3425* (2013.01)

(58) Field of Classification Search
CPC .......................... C09K 19/3003; G02F 1/1333
See application file for complete search history.

(56) References Cited

U.S. PATENT DOCUMENTS

| | | | | |
|---|---|---|---|---|
| 5,276,132 | A | 1/1994 | Nishikawa et al. | |
| 2004/0188653 | A1 | 9/2004 | Kataoka et al. | |
| 2010/0085523 | A1 | 4/2010 | Terashita et al. | |
| 2025/0257265 | A1* | 8/2025 | Iizuka | C08G 73/1078 |

FOREIGN PATENT DOCUMENTS

| | | | | |
|---|---|---|---|---|
| CN | 102241991 | A * | 11/2011 | G02F 1/1337 |
| CN | 107043630 | A | 8/2017 | |
| JP | 3-179323 | A | 8/1991 | |
| JP | 4-281427 | A | 10/1992 | |
| JP | 4504626 | B2 | 7/2010 | |
| JP | 2010-256857 | A | 11/2010 | |
| JP | 4995267 | B2 | 8/2012 | |
| WO | WO 2015/020083 | A1 | 2/2015 | |

OTHER PUBLICATIONS

Machine translation of CN-102241991-A (Year: 2011).*
International Search Report issued Aug. 1, 2023 in PCT/JP2023/018712, filed date on May 19, 2023, citing documents 19, 21 therein, 3 pages.
Extended European Search Report dated Apr. 9, 2026 of EP application No. 23807715.0 (9 pages).

* cited by examiner

*Primary Examiner* — Geraldina Visconti
(74) *Attorney, Agent, or Firm* — Oblon, McClelland, Maier & Neustadt, L.L.P.

(57) ABSTRACT

The present invention provides: a liquid crystal alignment film which has good liquid crystal alignment properties, while having excellent pretilt angle developability; a liquid crystal display element which is provided with this liquid crystal alignment film; and a liquid crystal aligning agent which enables the achievement of this liquid crystal alignment film. The present invention provides a liquid crystal aligning agent which contains: as a component (A), a compound that has a thermally crosslinkable group and a photo-alignment group represented by formula (pa-1), wherein the thermally crosslinkable group is capable of forming a covalent bond by being reacted with a carboxy group; and as a component (B), a polyamic acid and a solvent. (In formula (pa-1), A represents a phenylene group or the like; R1 represents —COO— or —OCO—; R2 represents a cyclohexane-1,4-diyl group; R3 represents a cyclohexane-1,4-diyl group; R4 represents a linear or branched alkyl group having 1 to 40 carbon atoms, and some or all of the hydrogen atoms in this alkyl group may be substituted by fluorine atoms; D represents an oxygen atom, a sulfur atom or —NRd-; a represents an integer of 0 to 3; and * denotes a bonding position.)

1 Claim, No Drawings

LIQUID CRYSTAL ALIGNING AGENT, LIQUID CRYSTAL ALIGNMENT FILM AND LIQUID CRYSTAL DISPLAY ELEMENT

This application is a national stage application of PCT/JP2023/018712, filed May 19, 2023, which claims priority to Japanese application 2022-083143, filed May 20, 2022. The content of both applications is incorporated by reference into this application.

TECHNICAL FIELD

The present invention relates to a liquid crystal aligning agent, a liquid crystal alignment film obtained using the same, and a liquid crystal display element comprising the resulting liquid crystal alignment film. More specifically, the present invention relates to a liquid crystal aligning agent that can provide a liquid crystal alignment film having good liquid crystal orientation properties, excellent pretilt angle expression ability and high reliability, and a liquid crystal display element having excellent display quality.

BACKGROUND ART

In a liquid crystal display element, a liquid crystal alignment film plays a role of aligning liquid crystal in a certain direction. At present, major liquid crystal alignment films used in the industrial field are made by applying to a substrate a polyimide liquid crystal aligning agent composed of polyamic acid or polyamic acid ester, which is a polyimide precursor or a polyimide solution, and forming a film.

Further, when liquid crystal is aligned in parallel or obliquely with the substrate surface, after film formation, the surface is further subjected to drawing treatment by rubbing.

On the other hand, when liquid crystal is oriented vertically to the substrate (referred to as vertical alignment (VA) system), a liquid crystal alignment film having a hydrophobic group such as a long-chain alkyl group, a cyclic group, or a combination of the cyclic group and the alkyl group (for example, see Patent Document 1), a steroid skeleton (for example, see Patent Document 2) in the side chain of polyimide is used. In this case, when the liquid crystal molecules are inclined toward the direction parallel to the substrate by application of a voltage between the substrates, the liquid crystal molecules need to be inclined toward one direction within the substrate surface from the normal direction of the substrate. As the methods for this, for example, a method for forming projections on the substrate, a method for forming a slit in the display electrode, a method for slightly inclining (pretilting) the liquid crystal molecules by rubbing from the normal direction of the substrate toward one direction within the substrate surface method, and a method for adding a light polymerizable compound to the liquid crystal composition in advance, using it together with a vertical alignment film such as a polyimide, and irradiating the liquid crystal cells with ultraviolet light under application of a voltage, thereby pretilting the liquid crystal, and the like are proposed (for example, see Patent Document 3).

In recent years, a method using anisotropic photochemical reaction by polarized ultraviolet irradiation or others (photoalignment method) is proposed as a replacement of the formation of projections and slits in the regulation of liquid crystal alignment of VA system, and the PSA technique. More specifically, it is known that the inclined direction of the liquid crystal molecules upon application of a voltage can be uniformly regulated by irradiating a vertically aligned polyimide film having photoreactivity with polarized ultraviolet light for imparting alignment regulating property and pretilt angle developing property (see Patent Document 4).

VA type liquid crystal display elements are used in TVs and car displays because of their high contrast and wide viewing angle. LCD display elements for TVs use backlights that generate a large amount of heat in order to achieve high brightness, and LCD display elements used in automobiles, such as car navigation systems and instrument panels may be used or left alone in high-temperature environments for long periods of time. Under such severe conditions, if the pretilt angle changes gradually, problems such as initial display characteristics not being obtained or display unevenness occur. Further, when driving the liquid crystal, the voltage retention characteristics and charge accumulation characteristics are also affected by the liquid crystal alignment film, and if the voltage retention rate is low, the contrast of the display screen will decrease, and if the charge accumulation with respect to the DC voltage is large, the phenomenon of burn-in of the display screen occurs.

PRIOR ART

Patent Document

Patent Document 1: JP-A No. 3-179323.
Patent Document 2: JP-A No. 4-281427.
Patent Document 3: Japan Patent No. 4504626.
Patent Document 4: Japan Patent No. 4995267.

SUMMARY OF INVENTION

Problems to be Solved by the Invention

The present invention has been developed in view of the above circumstances. An object of the present invention is to provide a liquid crystal alignment film having excellent display reliability with little change in pretilt angle even after long-term driving, high voltage holding characteristics, and reduced charge accumulation, a liquid crystal display element having the liquid crystal alignment film, and a liquid crystal aligning agent that provides the liquid crystal alignment film.

Means for Solving Problems

The present inventors have found the following invention <X> as a summary:

<X> A liquid crystal aligning agent comprising:

a compound having a photo-alignable group represented by the following formula (pa-1) and a thermally crosslinkable group as a component (A), wherein the thermally crosslinkable group reacts with a carboxy group to form a covalent bond;

a polyamic acid as a component (B); and a solvent.

(pa-1)

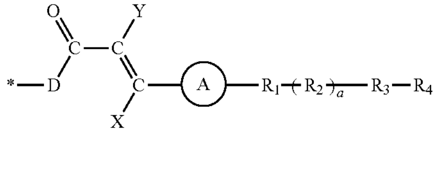

In the formula, A represents a pyrimidine-2,5-diyl group, a pyridine-2,5-diyl group, a thiophene-2,5-diyl group, a furan-2,5-diyl group, a 1,4- or 2,6-naphthylene group or a phenylene group, which may be optionally substituted with a group selected from a fluorine atom, a chlorine atom and a cyano group, an alkoxy group having 1 to 5 carbon atoms, or a linear or branched alkyl residue having 1 to 5 carbon atoms which may be optionally substituted with one cyano group, or one or more halogen atoms, $R_1$ represents —COO— or —OCO—, $R_2$ represents a cyclohexane-1,4-diyl group, $R_3$ represents a cyclohexane-1,4-diyl group, $R_4$ represents a linear or branched alkyl group having 1 to 40 carbon atoms wherein a part of hydrogen atoms or all hydrogen atoms of the alkyl group may be substituted with fluorine atoms, D represents an oxygen atom, a sulfur atom, or —$NR_d$— wherein $R_d$ represents a hydrogen atom or an alkyl group having 1 to 3 carbon atoms, a represents an integer from 0 to 3,

* represents a bonding position, and

X and Y each independently represents a hydrogen atom, a fluorine atom, a chlorine atom, a cyano group or an alkyl group having 1 to 3 carbon atoms wherein a part of hydrogen atoms or all hydrogen atoms of the alkyl group may be substituted with fluorine atoms.

Effects of the Invention

The present invention can provide a liquid crystal alignment film and a liquid crystal aligning agent that have good liquid crystal orientation properties and are also excellent in pretilt angle expression ability and pretilt angle stability.

Further, the liquid crystal display element manufactured by the method according to the present invention has excellent display characteristics.

EMBODIMENTS FOR CARRYING OUT THE INVENTION

The liquid crystal aligning agent according to the present invention comprises a compound having a photo-alignable group represented by the formula (pa-1) and a thermally crosslinkable group as a component (A), wherein the thermally crosslinkable group reacts with a carboxy group to form a covalent bond (hereinafter also referred to as a specific compound); a polyamic acid as a component (B); and a solvent.

The compound comprised in the liquid crystal aligning agent according to the present invention, the component (A), has the photo-alignable group and the thermally crosslinkable group. The photo-alignable group can exhibit alignment control ability even when irradiated with polarized ultraviolet light at a low exposure dose, since the photo-alignable group has high sensitivity to light.

Further, since the photoalignment group of the compound, component (A), is hydrophobic, when the liquid crystal aligning agent is applied to the substrate, the polyamic acid, component (B), is concentrated to the substrate side, and the compound, component (A), is concentrated to the surface layer side. As a result, since the photoalignable groups in the coating film obtained using the liquid crystal aligning agent according to the present invention are concentrated on the surface layer, so even if the content of the compound as component (A) is reduced, the coating film having good orientation can be obtained. In addition, since the thermally crosslinkable group of component (A) is a group that can react with a carboxy group to form a covalent bond, even if the baking time of the liquid crystal aligning agent is short, a crosslinking reaction of the compound that is the component (A) with the component (B) can be carried out. This makes it easier for the anisotropy to remain (memory) in the liquid crystal alignment film when the photoalignment site develops anisotropy due to a photoreaction. Thus, it becomes possible to increase the liquid crystal orientation properties and to develop the pretilt angle of the liquid crystal.

More, the liquid crystal aligning agent according to the present invention can also provide improved electrical properties such as improved voltage holding rate and suppressed residual charge accumulation by containing polyamic acid as component (B).

Each component of the present invention will be described in detail hereinafter.

<Component (A): Specific Compound>

The specific compound, i.e., the component (A) in the liquid crystal aligning agent according to the present invention has a photoalignable group represented by formula (pa-1) and a thermally crosslinkable group, wherein the thermally crosslinkable group reacts with a carboxy group to form a covalent bond. Such a specific compound may preferably be, for example, a compound represented by formula (a-1).

$$M_a\text{-}S_a\text{-}I_a \quad \text{(a-1)}$$

In formula (a-1), $M_a$ represents a thermally crosslinkable group. Examples of the thermally crosslinkable group may include organic groups selected from the group consisting of epoxy site-containing groups, oxetane site-containing groups, thiirane site-containing groups, and cyclocarbonate groups.

In the above formula (a-1), $S_a$ represents a spacer, and $I_a$ indicates that it is bonded to the thermally crosslinkable group, optionally via a spacer.

$S_a$ can be represented, for example, by the structure of the following formula (Sp).

$$—W_1\text{-}A_1\text{-}W_2\text{-}A_2\text{-}W_3— \quad \text{(Sp)}$$

In the formula (Sp), the bond left of $W_1$ represents a bond to $M_a$, the bond right of $W_3$ represents a bond to $I_a$, $W_1$, $W_2$, and $W_3$ each independently represents a single bond, a divalent heterocycle, —$(CH_2)_n$— (wherein n represents 1 to 20), —$OCH_2$—, —$CH_2O$—, —COO—, —OCO—, —CH═CH—, —CF═CF—, —$CF_2O$—, —$OCF_2$—, —$CF_2CF_2$— or —C≡C—, wherein in these substituents, one or more non-adjacent $CH_2$ groups may be independently substituted with —O—, —CO—, —CO—O—, —O—CO—, —$Si(CH_3)_2$—O—$Si(CH_3)_2$—, —NR—, —NR—CO—, —CO—NR—, —NR—CO—O—, —OCO—NR—, —NR—CO—NR—, —CH═CH—, —C≡C— or —O—CO—O— (wherein R independently represents hydrogen or a linear or branched alkyl group having a carbon atom number of 1 to 5), $A_1$ and $A_2$ each independently represents a single bond, an alkylene group, a divalent aromatic group, a divalent alicyclic group, or a divalent heterocyclic group, wherein each group may be unsubstituted, or one or more hydrogen atoms in each group may be substituted with a fluorine atom, a chlorine atom, a cyano group, a methyl group, or a methoxy group.

Examples of the aromatic group in $A_1$ and $A_2$ may include aromatic hydrocarbon groups having 6 to 18 carbon atoms such as a benzene ring, a biphenyl structure, and a naphthalene ring. Examples of the alicyclic group in $A_1$ and $A_2$ may include alicyclic hydrocarbon groups having 6 to 12 carbon atoms such as a cyclohexane ring and a bicyclohexane structure. Examples of the heterocycle in $A_1$ and $A_2$ may include nitrogen-containing heterocycles such as a pyridine ring, a piperidine ring, a piperazine ring and the like. Examples of the alkylene group for $A_1$ and $A_2$ may include linear or branched alkylene groups having 1 to 10 carbon atoms.

In formula (a-1), $I_a$ is a monovalent organic group represented by formula (pa-1).

(pa-1)

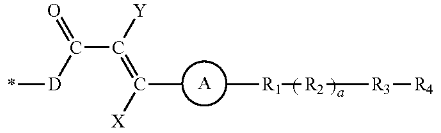

In the formula, A represents a pyrimidine-2,5-diyl group, a pyridine-2,5-diyl group, a thiophene-2,5-diyl group, a furan-2,5-diyl group, a 1,4- or 2,6-naphthylene group or a phenylene group, which may be optionally substituted with a group selected from a fluorine atom, a chlorine atom and a cyano group, an alkoxy group having 1 to 5 carbon atoms, or a linear or branched alkyl residue having 1 to 5 carbon atoms which may be optionally substituted with one cyano group or one or more halogen atoms, $R_1$ represents —COO— or —OCO—, $R_2$ represents a cyclohexane-1,4-diyl group, $R_3$ represents a cyclohexane-1,4-diyl group, $R_4$ represents a linear or branched alkyl group having 1 to 40 carbon atoms wherein a part of hydrogen atoms or all hydrogen atoms of the alkyl group may be substituted with fluorine atoms, D represents an oxygen atom, a sulfur atom, or —$NR_d$— wherein $R_d$ represents a hydrogen atom or an alkyl group having 1 to 3 carbon atoms, a represents an integer from 0 to 3, * represents a bonding position, X and Y each independently represents a hydrogen atom, a fluorine atom, a chlorine atom, a cyano group or an alkyl group having 1 to 3 carbon atoms wherein a part of hydrogen atoms or all hydrogen atoms of the alkyl group may be substituted with fluorine atoms. From the viewpoint of achieving good vertical alignment control ability and stable pretilt angle, a is preferably an integer of 1 to 3.

From the viewpoint of achieving good vertical alignment control ability and a stable pretilt angle, the group represented by the above formula (pa-1) may be a group represented by the following formula (pa-1-a), but is not limited thereto.

(pa-1-a)

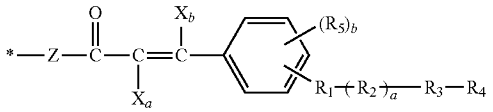

In formula (pa-1-a),

Z represents an oxygen atom or a sulfur atom.

$X_a$ and $X_b$ each independently represents a hydrogen atom, a fluorine atom, a chlorine atom, a cyano group, or an alkyl group having 1 to 3 carbon atoms, wherein some or all of the hydrogen atoms of the alkyl group may be substituted with fluorine atoms.

$R_1$ represents —COO— or —OCO—.

$R_2$ represents a cyclohexane-1,4-diyl group.

$R_3$ represents a cyclohexane-1,4-diyl group.

$R_4$ represents a linear or branched alkyl group having 1 to 40 carbon atoms, wherein some or all of the hydrogen atoms of the alkyl group may be substituted with fluorine atoms.

$R_5$ represents an alkyl group having 1 to 3 carbon atoms, an alkoxy group having 1 to 3 carbon atoms, a fluorine atom or a cyano group, preferably a methyl group, a methoxy group or a fluorine atom. When a plurality of $R_5$ exist, the plurality of $R_5$ may be the same or different.

a is an integer from 0 to 3, and b is an integer from 0 to 4.

In formula (a-1), the linear or branched alkylene group having 1 to 10 carbon atoms in $S_a$ may be a linear or branched alkylene group having 1 to 8 carbon atoms. The group may preferably be methylene group, ethylene group, n-propylene group, n-butylene group, tert-butylene group, n-pentylene group, n-hexylene group, n-heptylene group, and n-octylene group.

Examples of the divalent aromatic group of $S_a$ may include 1,4-phenylene group, 2-fluoro-1,4-phenylene group, 3-fluoro-1,4-phenylene group, 2,3,5,6-tetrafluoro-1,4-phenylene group, and the like.

In the formula (a-1), examples of the divalent alicyclic group of $S_a$ may include trans-1,4-cyclohexylene group, trans-trans-1,4-bicyclohexylene group and the like.

Examples of the divalent heterocyclic group of $S_a$ may include pyridine-2,6-diyl group, pyridine-3,5-diyl group, furan-2,5-diyl group, piperazine-1,4-diyl group, piperidine-1,4-diyl group and the like.

Preferably, $S_a$ may be an alkylene group having 1 to 8 carbon atoms, more preferably an alkylene group having 1 to 6 carbon atoms, and even more preferably an alkylene group having 1 to 4 carbon atoms.

In the above formula (a-1), the spacer $S_a$ may preferably be —$CH_2$—.

Examples of the linear or branched alkyl group having 1 to 40 carbon atoms for $R_4$ may include linear or branched alkyl groups having 1 to 20 carbon atoms, wherein some or all of the hydrogen atoms of the alkyl group may be substituted with fluorine atoms. Examples of such alkyl groups may include methyl group, ethyl group, n-propyl group, n-butyl group, tert-butyl group, n-pentyl group, n-hexyl group, n-heptyl group, n-octyl group, n-nonyl group, n-decyl group, n-lauryl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 4,4,4-trifluorobutyl group, 4,4,5,5,5-pentafluoropentyl group, 4,4,5,5,6,6,6-heptafluorohexyl group, 3,3,4,4,5,5,5-heptafluoropentyl group, 2,2,2-trifluoroethyl group, 2,2,3,3,3-pentafluoropropyl group, 2-(perfluorobutyl)ethyl group, 2-(perfluorooctyl) ethyl group, 2-(perfluorodecyl)ethyl group and the like.

Specific compound, i.e., the component (A) may include, but are not limited to, compounds represented by formulas (paa-1-ma1) to (paa-1-ma4). In the formula, "E" represents the E form, and "t" represents the trans form of the cyclohexyl group.

(paa-1-ma1)

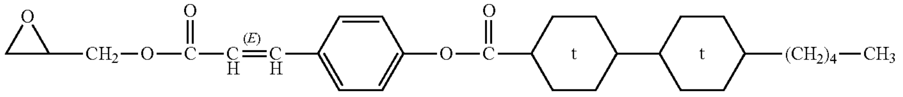

(paa-1-ma2)

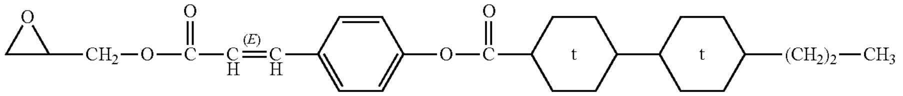

(paa-1-ma3)

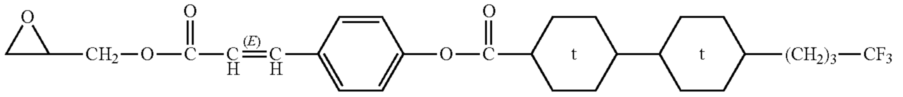

(paa-1-ma4)

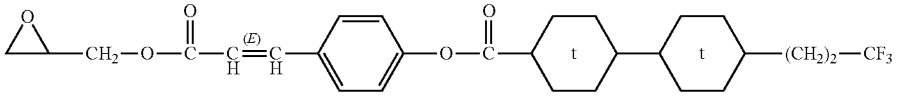

<Method for Producing Specific Compound>

The specific compound, i.e., the component (A) can be produced by combining known reactions. Specifically, it can be produced by the method described in "Specific Compound Synthesis Example" below or a method similar thereto.

<Component (B)>

The liquid crystal aligning agent according to the present invention comprises polyamic acid (P) as the component (B).

The above polyamic acid (P) can be obtained by a polymerization reaction between a diamine component and a tetracarboxylic acid component containing a tetracarboxylic dianhydride.

(Diamine)

As the diamine component used in the production of the polyamic acid (P), various diamines can be used depending on the purpose. Furthermore, the diamines used in the production of polyamic acid (P) may be used alone or in combination of two or more. Preferred specific examples of the diamine (hereinafter also referred to as diamine (p)) used in the production of polyamic acid (P) may include the following diamines:

Aromatic diamine (d) represented by "A-X-J" (details will be described hereinafter) may be p-phenylenediamine, 2,3,5,6-tetramethyl-p-phenylenediamine, 2,5-dimethyl-p-phenylenediamine, m-phenylenediamine, 2,4-dimethyl-m-phenylenediamine, 2,5-diaminotoluene, 2,6-diaminotoluene, 2,2'-dimethyl-4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 2,2'-difluoro-4,4'-diaminobiphenyl, 3,3'-difluoro-4,4'-diaminobiphenyl, 2,2'-bis(trifluoromethyl)-4,4'-diaminobiphenyl, 3,3'-bis(trifluoromethyl)-4,4'-diaminobiphenyl, 3,4'-diaminobiphenyl, 4,4'-diaminobiphenyl, 3,3'-diaminobiphenyl, 2,2'-diaminobiphenyl, 2,3'-diaminobiphenyl, 1,5-diaminonaphthalene, 1,6-diaminonaphthalene, 1,7-diaminonaphthalene, 2,5-diaminonaphthalene, 2,6-diaminonaphthalene, 2,7-diaminonaphthalene, bis(4-aminophenoxy)methane, 1,2-bis(4-aminophenyl)ethane, 1,2-bis(4-aminophenoxy)ethane, 1,3-bis(3-aminophenyl) propane, 1,4-bis(4-aminophenyl) butane, 1,4-bis(4-amino-2-methylphenyloxy) butane, 1,4-bis(3-aminophenyl) butane, bis(3,5-diethyl-4-aminophenyl)methane, 1,5-bis(4-aminophenoxy) pentane, 1,5-bis(3-aminophenoxy) pentane, 1,6-bis(4-aminophenoxy)hexane, 1,6-bis(3-aminophenoxy) hexane, 1,7-bis(4-aminophenoxy) heptane, 1,7-bis(3-aminophenoxy) heptane, 1,8-bis(4-aminophenoxy) octane, 1,8-bis (3-aminophenoxy) octane, 1,9-bis(4-aminophenoxy) nonane, 1,9-bis(3-aminophenoxy) nonane, 1,10-bis(4-aminophenoxy) decane, 1,10-bis(3-aminophenoxy) decane, 1,11-bis(4-aminophenoxy) undecane, 1,11-bis(3-aminophenoxy) undecane, 1,12-bis(4-aminophenoxy) dodecane, 1,12-bis(3-aminophenoxy) dodecane, 3-[2-[2-(4-aminophenoxy) ethoxy]ethoxy]benzenamine, 1,4-bis(4-aminophenoxy) benzene, 1,3-bis(4-aminophenoxy)benzene, 1,4-bis(4-aminophenyl)benzene, 1,3-bis(4-aminophenyl)benzene, 4,4'-bis(4-aminophenoxy)diphenyl, 4,4'-bis(4-aminophenoxy)diphenyl ether, 1,4-bis[4-(4-aminophenoxy)phenoxy] benzene, 1,2-bis(6-amino-2-naphthyloxy)ethane, 1,2-bis(6-amino-2-naphthyl)ethane, 6-[2-(4-aminophenoxy)ethoxy]-2-naphthylamine, 4'-[2-(4-aminophenoxy)ethoxy]-[1,1'-biphenyl]-4-amine, 1,4-bis[2-(4-aminophenyl)ethyl] butanedioate, 1,6-bis[2-(4-aminophenyl)ethyl] hexanedioate, 1,4-phenylenebis(4-aminobenzoate), 1,4-phenylenebis(3-aminobenzoate), 1,3-phenylenebis(4-aminobenzoate), 1,3-phenylenebis(3-aminobenzoate), bis (4-aminophenyl) terephthalate, bis(3-aminophenyl) terephthalate, bis(4-aminophenyl) isophthalate, bis(3-aminophenyl) isophthalate; diamines having a photo-alignable group such as 4,4'-diaminoazobenzene, diaminotran, 4,4'-diaminochalcone, or [4-[(E)-3-[2-(2,4-diaminophenyl) ethoxy]-3-oxo-prop-1-enyl]phenyl]4-(4,4,4-trifluorobutoxy)benzoate, or aromatic diamines having a cinnamate structure in the side chain such as [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl]4-(4,4,4-trifluorobuthoxy) benzoate and the like; diamines having photopolymerizable group at terminal end, such as 2-(2,4-diaminophenoxy)ethyl methacrylate, 2,4-diamino-N,N-diallylaniline and the like; diamines having a radical polymerization initiator function in the molecule such as 1-(4-(2-(2,4-diaminophenoxy) ethoxy)phenyl)-2-hydroxy-2-methylpropanone, benzoin or its alkyl etherified products represented by 2-(4-(2-hydroxy-2-methylpropanoyl)phenoxy)ethyl 3,5-diaminobenzoate, benzyl ketals, acetophenones, acyl phosphine oxides, benzophenones, or aminobenzophenones; diamines having an amide bond such as 4,4'-diaminobenzanilide, diamines having a urea bond such as 1,3-bis(4-aminophenyl)urea, 1,3-bis(4-aminobenzyl)urea, 1,3-bis(4-aminophenethyl)urea and the like; 4,4'-sulfonyldianiline, 3,3'-sulfonyldianiline, bis(4-aminophenyl)silane, bis(3-aminophenyl)silane, dimethyl-bis(4-aminophenyl)silane, dimethyl-bis(3-aminophenyl)silane, 4,4'-thiodianiline, 3,3'-thiodianiline, 3,3'-diaminodiphenyl ether, 3,4'-diaminodiphenyl ether, 4,4'-diaminodiphenyl ether, 1,4-bis(4-aminophenoxy)benzene, 1,3-bis(4-aminophenoxy)benzene, 2,2-bis[4-(4-aminophenoxy)phenyl]propane, 2,2-bis[4-(4-aminophenoxy)phenyl] hexafluoropropane, 2,2-bis(4-aminophenyl)hexafluoropropane, 2,2-bis(3-aminophenyl)hexafluoropropane, 2,2-bis(3-amino-4-methylphenyl)hexafluoropropane, 2,2-bis(4-aminophenyl)propane, 2,2-bis(3-aminophenyl)propane, 2,2-bis(3-amino-4-methylphenyl)propane, 3,3'-diaminodiphenylmethane, 3,4'-diaminodiphenylmethane, 4,4'-diaminodiphenylmethane, 4,4'-diaminobenzophenone, 1,4-bis(4-aminophenyl)benzene, 1,3-bis(4-aminophenyl) benzene, 1,4-bis(4-aminobenzyl)benzene; diamines having at least one nitrogen-containing structure selected from the group consisting of a nitrogen-containing heterocycle, a secondary amino group, and a tertiary amino group (however, the diamine does not comprise in the molecule an amino group bonded with a protecting group that is eliminated by heating and replaced by a hydrogen atom), represented by heterocycle-containing diamines such as 2,6-diaminopyridine, 3,4-diaminopyridine, 2,4-diaminopyrimidine, 3,6-diaminocarbazole, N-methyl-3,6-diaminocarbazole, 1,4-bis-(4-aminophenyl)-piperazine, 3,6-diaminoacridine, N-ethyl-3,6-diaminocarbazole, N-phenyl-3,6-diaminocarbazole, N-[3-(1H-imidazol-1-yl)propyl]-3,5-diaminobenzamide, 4-[4-[(4-aminophenoxy)methyl]-4,5-dihydro-4-methyl-2-oxazolyl]-benzenamine, 1,4-bis(p-aminobenzyl)piperazine, 4,4'-propane-1,3-diylbis (piperidine-1,4-diyl)dianiline, 4-(4-aminophenoxycarbonyl)-1-(4-aminophenyl)piperidine, diamines represented by the following formulas (z-1) to (z-5), 2,5-bis(4-aminophenyl)pyrrole, 4,4'-(1-methyl-1H-pyrrole-2,5-diyl)bis[benzenamine], 1,4-bis-(4-aminophenyl)-piperazine, 2-N-(4-aminophenyl)pyridine-2,5-diamine, 2-N-(5-aminopyridin-2-yl)pyridine-2,5-diamine, 2-(4-aminophenyl)-5-aminobenzimidazole, 2-(4-aminophenyl)-6-aminobenzimidazole, 5-(1H-benzimidazol-2-yl)benzene-1, 3-diamine, or diamines having diphenylamine structure such as 4,4'-diaminodiphenylamine, 4,4'-diaminodiphenyl-N-methylamine, N,N'-bis(4-aminophenyl)-1,4-benzenediamine, N,N'-bis(4-aminophenyl)-benzidine, N,N'-bis(4-aminophenyl)-N,N'-dimethylbenzidine or N,N'-bis(4-aminophenyl)-N,N'-dimethyl-1,4-benzenediamine;

diamines having a carboxy group such as 2,4-diaminobenzoic acid, 2,5-diaminobenzoic acid, 3,5-diaminobenzoic acid, 4,4'-diaminobiphenyl-3-carboxylic acid, 4,4'-diaminodiphenylmethane-3-carboxylic acid acid, 1,2-bis(4-aminophenyl)ethane-3-carboxylic acid, 4,4'-diaminobiphenyl-3,3'-dicarboxylic acid, 4,4'-diaminobiphenyl-2,2'-dicarboxylic acid acid, 3,3'-diaminobiphenyl-4,4'-dicarboxylic acid, 3,3'-diaminobiphenyl-2,4'-dicarboxylic acid, 4,4'-diaminodiphenylmethane-3,3'-dicarboxylic acid, 1,2-bis(4-aminophenyl) ethane-3,3'-dicarboxylic acid and 4,4'-diaminodiphenyl ether-3,3'-dicarboxylic acid; 2,4-diaminophenol, 3,5-diaminophenol, 3,5-diaminobenzyl alcohol, 2,4-diaminobenzyl alcohol, 4,6-diaminoresorcinol, 4,4'-diamino-3,3'-dihydroxybiphenyl; 4-(2-(methylamino)ethyl) aniline, 4-(2-aminoethyl) aniline, 1-(4-aminophenyl)-1,3,3-trimethyl-1H-indan-5-amine, 1-(4-aminophenyl)-2,3-dihydro-1,3,3-trimethyl-1H-inden-6-amine; diamines having the group "—N(D)-" (D represents a protective group that is eliminated by heating and replaced with a hydrogen atom, and is preferably a tert-butoxycarbonyl group.) such as N1,N6-bis (2-tert-butoxycarbonylamino-4-aminophenyl) adipamide, 4-amino-N-(2-tert-butoxycarbonylamino-4-aminophenyl) benzamide, carbamic acid, N-[(2,5-diaminophenyl) methyl]-, 1,1-dimethylethyl ester, carbamic acid, N-[3-(2,5-diaminophenyl)propyl]-,1,1-dimethylethyl ester, carbamic acid, N,N-[(2,5-diamino-1,3-phenylene)di-3,1-propanediyl] bis-,C,C-bis(1,1-dimethylethyl) ester, N-tert-butoxycarbonyl-N-(2-(4-aminophenyl)ethyl)-N-(4-aminobenzyl) Amine, benzoic acid, 4-amino-2-tert-butoxycarbonylamino-,1,1'-[(1,1,3,3-tetramethyl-1,3-disiloxanediyl)di-4,1-butanediyl]ester, carbamic acid, N-[2-(4-aminophenyl) ethyl]-N-[[[2-(4-aminophenyl)ethyl]amino]carbonyl]-, 1,1-dimethylethyl ester, carbamic acid, N-(4-aminophenyl)-N-[[1-(4-aminophenyl)-4-piperidinyl]methyl]-, 1,1-dimethylethyl ester, aromatic diamines (tn) having a long chain alkyl group having 12 to 20 carbon atoms, represented by 1-dodecanoxy-2,4-diaminobenzene, 1-tetradecanoxy-2,4-diaminobenzene, 1-pentadecanoxy-2,4-diaminobenzene, 1-hexadecanoxy-2,4-diaminobenzene, 1-octadecanoxy-2,4-diaminobenzene, 1-dodecanoxy-2,5-diaminobenzene, 1-tetradecanoxy-2,5-diaminobenzene, 1-pentadecanoxy-2,5-diaminobenzene, 1-hexadecanoxy-2,5-diaminobenzene and 1-octadecanoxy-2,5-diaminobenzene; diamines having siloxane bonds such as 1,3-bis(3-aminopropyl)-tetramethyldisiloxane, 1,3-bis[3-(p-aminophenylcarbamoyl)propyl]tetramethyldisiloxane; metaxylylenediamine, 1,3-propanediamine, tetramethylenediamine, pentamethylenediamine, hexamethylenediamine, 1,3-bis(aminomethyl)cyclohexane, 1,4-diaminocyclohexane, 4,4'-methylenebis(cyclohexylamine), diamines, in which two amino groups are bonded to a group represented by any one of (Y-1) to (Y-167)disclosed in WO2018/117239.

(z-1)

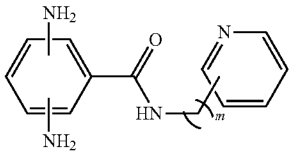

m = 1~6

(z-2)

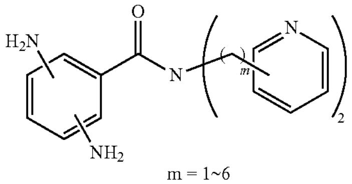

m = 1~6

(z-3)

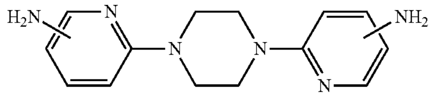

(z-4)

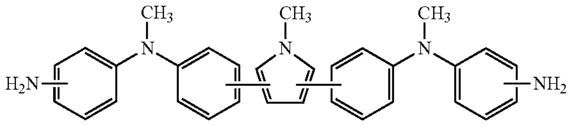

(z-5)

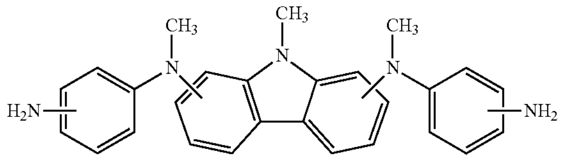

In the aromatic diamine (d) represented by the above "A-X-J", A represents a monovalent group in which two primary amino groups are bonded to an aromatic group. Specific examples of the aromatic group may include a benzene ring, a naphthalene ring, and a biphenyl structure. X represents a single bond, —$(CH_2)_a$— (a is an integer from 1 to 15), —CONH—, —NHCO—, —CO—$N(CH_3)$—, —NH—, —O—, —COO—, —OCO— or -$(A_0)_{m0}$-$((CH_2)_{a1}$-$A_1)_{m1}$- (a1 is an integer from 1 to 15, $A_0$ and $A_1$ each represents an oxygen atom or —COO—, m0 is an integer of 0 or 1, and m1 is an integer of 1 to 2. When m1 is 2, a plurality of a1 and $A_1$ each independently has the above definition).

J represents a monovalent organic group having at least one group selected from the group consisting of an alicyclic hydrocarbon group having 4 to 40 carbon atoms and an aromatic hydrocarbon group having 6 to 40 carbon atoms. However, at least one of the hydrogen atoms possessed by the above alicyclic hydrocarbon group and aromatic hydrocarbon group is substituted with a substituent (v), which is any one of a halogen atom, a halogen atom-containing alkyl group, a halogen atom-containing alkoxy group, an alkyl group having 3 to 10 carbon atoms, an alkoxy group having 3 to 10 carbon atoms and an alkenyl group having 3 to 10 carbon atoms. Further, any carbon-carbon single bond in the substituent (v) (excluding halogen atoms) may be interrupted by —O—. Furthermore, J may further comprise at least one group selected from the group p consisting of an alicyclic hydrocarbon group and aromatic group that is unsubstituted or substituted with a substituent other than the above-mentioned substituent (v), in addition to the above-mentioned alicyclic hydrocarbon group and aromatic hydrocarbon group.

Examples of the halogen atom-containing alkyl group may include halogen atom-containing alkyl groups having 1 to 10 carbon atoms.

Examples of the halogen atom-containing alkoxy group may include halogen atom-containing alkoxy groups having 1 to 10 carbon atoms.

Examples of the alicyclic hydrocarbon group of J may include cyclobutane ring, cyclopentane ring, cyclohexane ring, cyclodecane ring, steroid skeleton (for example, cholestanyl group, cholesteryl group, lanostanyl group, and the like). Examples of the aromatic hydrocarbon group may include a benzene ring, a naphthalene ring, and the like. When J has at least one of a cyclohexane ring and a benzene ring, examples of the group "—X-J" may include the following structure (S1), more preferably structures including the following formulas (S1-1) to (S1-5), wherein, $X^1$, $R^1$ and * have the same definitions as $X^1$, $R^1$ and * described in formula (S1).

$$*-(X^1-G^1)_m-R^1 \quad \text{(S1)}$$

In the formula, $X^1$ represents a single bond, —$(CH_2)_a$— (a is an integer from 1 to 15), —CONH—, —CO—N$(CH_3)$—, —NH—, —O—, —COO—, or -$(A_0)_{m0}$-$((CH_2)_{a1}$-$A_1)_{m1}$- (a1 is an integer from 1 to 15, $A_0$ and $A_1$ each represents an oxygen atom or —COO—, m0 is an integer of 0 or 1, and m1 is an integer of 1 to 2. When m1 is 2, a plurality of a1 and A1 each independently has the above definition. * represents the bonding position).

$G^1$ represents a divalent cyclic group selected from a phenylene group and a cyclohexylene group. Any hydrogen atom on the cyclic group may be substituted with an alkyl group having 1 to 3 carbon atoms, an alkoxy group having 1 to 3 carbon atoms, a fluorine-containing alkyl group having 1 to 3 carbon atoms, a fluorine-containing alkoxy group having 1 to 3 carbon atoms or a fluorine atom.

m is an integer from 1 to 4. When m is 2 or more, the plurality of $X^1$ and $G^1$ each independently has the above definition.

$R^1$ represents a fluorine atom, a fluorine atom-containing alkyl group having 1 to 10 carbon atoms, a fluorine atom-containing alkoxy group having 1 to 10 carbon atoms, an alkyl group having 3 to 10 carbon atoms, an alkoxy group having 3 to 10 carbon atoms, or an alkoxyalkyl group having 3 to 10 carbon atoms.

(S1-1)

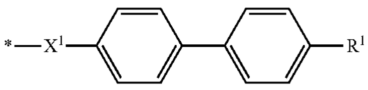

(S1-2)

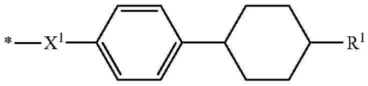

(S1-3)

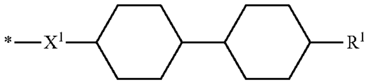

(S1-4)

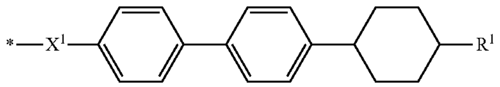

(S1-5)

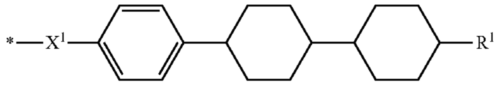

Specific examples of the aromatic diamine (d) may include diamines represented by the following formulas (d-1) to (d-2). More preferable specific examples may include diamines represented by formulas (d-1) to (d-2), in which the group "—X-J" is any one of the above structure (S1) and the above formulas (S1-1) to (S1-5), as well as diamines having a steroid skeleton such as cholestanyloxy-3,5-diaminobenzene, cholestenyloxy-3,5-diaminobenzene, cholestanyloxy-2,4-diaminobenzene, cholestanyl 3,5-diaminobenzoate, cholestenyl 3,5-diaminobenzoate, lanostanyl 3,5-diaminobenzoate and 3,6-bis(4-aminobenzoyloxy) cholestane and the like.

(d-1)

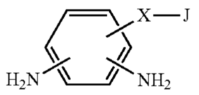

(d-2)

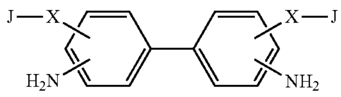

X and J have the same definitions as X and J in the above aromatic diamine (d), including preferred embodiments. In the formula (d-2), the two X and J may be the same or different.

When the aromatic diamine (d) is used as the diamine (p), it is preferably 5 to 95 mol %, more preferably 10 to 90 mol % of the total diamine component used to produce the polyamic acid (P).

(Tetracarboxylic Dianhydride)

A tetracarboxylic dianhydride that can be used in the synthesis of the polyamic acid (P) may include at least one selected from the group consisting of acyclic aliphatic tetracarboxylic dianhydrides, alicyclic tetracarboxylic dianhydrides, and aromatic tetracarboxylic dianhydrides. Among them, it is more preferable to include a tetracarboxylic dianhydride having at least one partial structure selected from the group consisting of a benzene ring, a cyclobutane ring structure, a cyclopentane ring structure and a cyclohexane ring structure, more preferably a tetracarboxylic dianhydride having at least one partial structure selected from the group consisting of a cyclobutane ring structure, cyclopentane ring structure and a cyclohexane ring structure.

As the tetracarboxylic acid component that can be used for the synthesis of polyamic acid (P), the following tetracarboxylic dianhydrides (hereinafter also collectively referred to as specific tetracarboxylic dianhydrides) are preferable.

Furthermore, the above tetracarboxylic dianhydride may be used individually by 1 type, and may be used in combination of 2 or more types.

Acyclic aliphatic tetracarboxylic dianhydride such as 1,2,3,4-butanetetracarboxylic dianhydride; alicyclic tetracarboxylic dianhydrides such as 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,3-difluoro-1,2,3,4-cyclobutanetetracarboxylic dianhydride, 1,3-bis(trifluoromethyl)-1,2,3,4-cyclobutanetetracarboxylic dianhydride, 1,2,3,4-cyclopentanetetracarboxylic acid dianhydride, 1,2,4,5-cyclohexanetetracarboxylic dianhydride, 3,3',4,4'-dicyclohexyltetracarboxylic dianhydride, 2,3,5-tricarboxycyclopentyl acetic dianhydride, 4-(2,5-dioxotetrahydrofuran-3-yl)tetrahydronaphthalene-1,2-dicarboxylic anhydride, 5-(2,5-dioxotetrahydrofuran-3-yl)-3a,4,5,9b-tetrahydronaphtho[1,2-c]furan-1,3-dione, 5-(2,5-dioxotetrahydrofuran-3-yl)-8-methyl-3a,4,5,9b-tetrahydronaphtho[1,2-c]furan-1,3-dione, bicyclo[2.2.2]oct-7-ene-2,3,5,6-tetracarboxylic dianhydride, bicyclo[2.2.2]octane-2,3,5,6-tetracarboxylic dianhydride, 2,4,6,8-tetracarboxybicyclo[3.3.0]octane-2:4,6:8-dianhydride; aromatic tetracarboxylic dianhydride such as pyromellitic dianhydride, 3,3',4,4'-benzophenonetetracarboxylic dianhydride, 3,3',4,4'-diphenylsulfonetetracarboxylic dianhydride, 1,4,5,8-naphthalenetetracarboxylic dianhydride, 2,3,6,7-naphthalenetetracarboxylic dianhydride, 3,3',4,4'-diphenyl ether tetracarboxylic dianhydride, 3,3',4,4'-biphenyltetracarboxylic dianhydride, 2,2',3,3'-biphenyltetracarboxylic dianhydride, 4,4'-bis(3,4-dicarboxyphenoxy)diphenylpropane dianhydride, ethylene glycol bisanhydrotrimellitate, 4,4'-(hexafluoroisopropylidene)diphthalic anhydride, 4,4'-carbonyldiphthalic anhydride, 4,4'-(1,4-phenylenedioxy)bis(phthalic anhydride) or 4,4'-(1,4-phenylene dimethylene)bis(phthalic anhydride); in addition, tetracarboxylic dianhydride described in JP-A No. 2010-97188; and the like.

Preferred examples of the specific tetracarboxylic acid derivatives may include 1,2,3,4-butanetetracarboxylic dianhydride, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,2,3,4-tetramethyl-1,2,3,4-cyclobutanetetracarboxylic dianhydride, 1,3-difluoro-1,2,3,4-cyclobutanetetracarboxylic dianhydride, 1,3-bis(trifluoromethyl)-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexyltetracarboxylic dianhydride, 2,3,5-tricarboxycyclopentyl acetic acid dianhydride, 5-(2,5-dioxotetrahydrofuran-3-yl)-3a,4,5,9b-tetrahydronaphtho[1,2-c]furan-1,3-dione, 5-(2,5-dioxotetrahydrofuran-3-yl)-8-methyl-3a,4,5,9b-tetrahydronaphtho[1,2-c]furan-1,3-dione, 2,4,6,8-tetracarboxybicyclo[3.3.0]octane-2:4,6:8-dianhydride, pyromellitic acid dianhydride, 3,3',4,4'-benzophenonetetracarboxylic dianhydride, 3,3',4,4'-diphenylsulfonetetracarboxylic dianhydride, 1,4,5,8-naphthalenetetracarboxylic dianhydride, 2,3,6,7-naphthalenetetracarboxylic dianhydride, 3,3',4,4'-diphenyl ether tetracarboxylic dianhydride, 3,3',4,4'-biphenyltetracarboxylic dianhydride and 2,2',3,3'-biphenyltetracarboxylic dianhydride.

The usage ratio of the specific tetracarboxylic dianhydride may preferably be 10 mol % or more, more preferably 20 mol % or more, even more preferably 50 mol % or more, based on 1 mol of the total tetracarboxylic acid components used.

(Synthesis of Polyamic Acid)

Synthesis of the polyamic acid may be carried out by reacting a diamine component containing the above-mentioned diamine and a tetracarboxylic acid component containing the above-mentioned tetracarboxylic dianhydride or its derivative in an organic solvent. The ratio of tetracarboxylic dianhydride and diamine used in the synthesis reaction of the polyamic acid may be 0.5 to 2, preferably 0.8 to 1.2 acid anhydride groups of the tetracarboxylic dianhydride to 1 equivalent of amino group of the diamine. As in a normal polycondensation reaction, the closer the equivalent of the acid anhydride group of the tetracarboxylic dianhydride is to 1 equivalent, the larger the molecular weight of the produced polyamic acid becomes.

The reaction temperature in the polyamic acid synthesis reaction may preferably be −20 to 150° C., more preferably 0 to 100° C. Further, the reaction time may preferably be 0.1 to 24 hours, more preferably 0.5 to 12 hours.

The polyamic acid synthesis reaction can be carried out at any concentration, preferably 1 to 50% by mass, more preferably 5 to 30% by mass. It is also possible to carry out the reaction at a high concentration in the initial stage and then add a solvent.

Specific examples of the above organic solvent may include compound (a), cyclohexanone, cyclopentanone, N-methyl-2-pyrrolidone, N-ethyl-2-pyrrolidone, Y-butyrolactone, N,N-dimethylformamide, N,N-dimethylacetamide, dimethylsulfoxide, and 1,3-dimethyl-2-imidazolidinone. Further, if the polymer has high solvent solubility, methyl ethyl ketone, cyclohexanone, cyclopentanone, 4-hydroxy-4-methyl-2-pentanone, propylene glycol monomethyl ether, ethylene glycol monomethyl ether, ethylene glycol monoethyl ether, ethylene glycol monopropyl ether, diethylene glycol monomethyl ether, or diethylene glycol monoethyl ether can be used.

<Terminal Capping Agent>

When synthesizing the polyamic acid according to the present invention, a terminal-capped polymer may be synthesized using a suitable terminal capping agent together with a tetracarboxylic acid component containing a tetracarboxylic dianhydride or a derivative thereof and a diamine component containing the above-mentioned diamine. The end-capped polymer has the effect of improving the film hardness of the alignment film obtained by coating and improving the adhesion characteristics between the sealant and the alignment film.

Examples of the terminal of the polyamic acid in the present invention may include an amino group, a carboxy group, an acid anhydride group, and a group derived from the terminal capping agent described below. The amino group, carboxy group, and acid anhydride group can be obtained by a conventional condensation reaction or by capping the terminal using the terminal capping agent described hereinafter.

Examples of the terminal capping agent may include acid anhydrides such as acetic anhydride, maleic anhydride, nadic anhydride, phthalic anhydride, itaconic anhydride, cyclohexanedicarboxylic anhydride, 3-hydroxyphthalic anhydride, trimellitic anhydride, 3-(3-trimethoxysilyl)propyl-3,4-dihydrofuran-2,5-dione, 4,5,6,7-tetrafluoroisobenzofuran-1,3-dione, and 4-ethynyl phthalic anhydride; dicarbonate diester compounds such as di-tert-butyl dicarbonate and diallyl dicarbonate; chlorocarbonyl compounds such as acryloyl chloride, methacryloyl chloride, and nicotinic acid chloride; monoamine compounds such as aniline, 2-aminophenol, 3-aminophenol, 4-aminosalicylic acid, 5-aminosalicylic acid, 6-aminosalicylic acid, 2-aminobenzoic acid, 3-aminobenzoic acid, 4-aminobenzoic acid, cyclohexylamine, n-butylamine, n-pentylamine, n-hexylamine, n-heptylamine and n-octylamine; ethyl isocyanate, phenyl isocyanate, naphthyl isocyanate, or isocyanates with unsaturated bonds such as 2-acryloyloxyethyl isocyanate, 2-methacryloyloxyethyl isocyanate, and the like.

The proportion of the terminal capping agent used may preferably be 0.01 to 20 parts by mole, more preferably 0.01 to 10 parts by mole, to a total of 100 parts by mole of the diamine component used.

The weight average molecular weight (Mw) of the polyamic acid measured by gel permeation chromatography (GPC) in terms of polystyrene may preferably be 1,000 to 500,000, more preferably 2,000 to 300,000. Further, the molecular weight distribution (Mw/Mn) expressed as the ratio of Mw to the number average molecular weight (Mn) in terms of polystyrene measured by GPC may preferably be 15 or less, more preferably 10 or less. The molecular weight having the above-described range can result in good alignment of the liquid crystal display element.

The amount of the specific compound, i.e., the component (A) in the liquid crystal aligning agent according to the present invention may preferably be 0.5 to 30 parts by mass, more preferably 0.8 to 20 parts by mass, even more preferably 1 to 10 parts by mass to 100 parts by mass of the polyamic acid component, i.e., the component (B).

[Preparation of Liquid Crystal Alignment Agent]

The liquid crystal alignment agent used in the present invention may be prepared as a coating liquid so that it is suitable for forming a liquid crystal alignment film. That is, the liquid crystal aligning agent according to the present invention may be prepared as a solution in which a resin component for forming a resin film is dissolved in an organic solvent. Here, the resin component means the specific compound, i.e., the component (A) and the polyamic acid, i.e., the component (B), which have already been described. The total content of the specific compound as component (A) and the content of the polyamic acid as component (B) may be preferably 0.5 to 20% by mass, more preferably 1 to 20% by mass, even more preferably 1 to 15% by mass, particularly preferably 1 to 10% by mass based on the entire liquid crystal aligning agent.

<Solvent>

The solvent contained in the liquid crystal aligning agent used in the present invention is not particularly limited as long as it is a solvent that dissolves the components (A) and (B). The number of solvents contained in the liquid crystal aligning agent may be one, or a mixture of two or more may be used. Furthermore, the solvent does not have to be one solvent that dissolves the components (A) and (B), but can be used in combination with a solvent that dissolves the component (A) or the component (B). In this case, it is preferable that the surface energy of the solvent that does not dissolve component (A) or (B) is lower than that of the solvent that dissolves component (A) or (B), improving the coating properties of the liquid crystal aligning agent on the substrate.

Specific examples of the solvent may include water, N-alkyl-2-pyrrolidones such as N-methyl-2-pyrrolidone and N-ethyl-2-pyrrolidone, N,N-dimethylformamide, N,N-dimethylacetamide, N-methyl-ε-caprolactam, tetramethylurea, 3-methoxy-N,N-dimethylpropanamide, 3-ethoxy-N,N-dimethylpropanamide, 3-butoxy-N,N-dimethylpropanamide, dialkyl imidazolidinones such as 1,3-dimethyl-2-imidazolidinone, lactones such as γ-butyrolactone, γ-valerolactone, and δ-valerolactone, carbonates such as ethylene carbonate and propylene carbonate, methanol, ethanol, propanol, isopropanol, 3-methyl-3-methoxybutanol, ketones such as ethyl amyl ketone, methyl nonyl ketone, methyl ethyl ketone, isoamyl methyl ketone, methyl isopropyl ketone, diisobutyl ketone, cyclohexanone, cyclopentanone, methyl isobutyl ketone, 4-hydroxy-4-methyl-2-pentanone, compounds represented by the following formula (Sv-1) and compounds represented by the following formula (Sv-2), 4-methyl-2-pentyl acetate, 2-ethylbutyl acetate, 2-ethylhexyl acetate, cyclohexyl acetate, 2-methylcyclohexyl acetate, butyl butyrate, isoamyl butyrate, diisobutyl carbinol, diisopentyl ether, and the like.

$$Y_1—X_1—(R_1—O)_{n_1}—X_2—Y_2 \quad \text{(Sv-1)}$$

$$Y_3—O—Z_1—COO—Y_4 \quad \text{(Sv-2)}$$

In formulas (Sv-1) to (Sv-2), $Y_1$ and $Y_2$ each represents independently a hydrogen atom or a monovalent hydrocarbon group having 1 to 6 carbon atoms, $X_1$ represents an oxygen atom or —COO—, $X_2$ represents a single bond or a carbonyl group, $R_1$ represents an alkanediyl group having 2 to 4 carbon atoms, and $n_1$ represents an integer from 1 to 3. When $n_1$ is 2 or 3, a plurality of $R_1$ may be the same or different. $Z_1$ represents a divalent hydrocarbon group having 1 to 6 carbon atoms, and $Y_3$ and $Y_4$ each represents independently a hydrogen atom or a monovalent hydrocarbon group having 1 to 6 carbon atoms.

In formula (Sv-1), the monovalent hydrocarbon group having 1 to 6 carbon atoms in $Y_1$ and $Y_2$ may be, for example, a monovalent linear hydrocarbon group having 1 to 6 carbon atoms, a monovalent alicyclic hydrocarbon group having 1 to 6 carbon atoms and a monovalent aromatic hydrocarbon group having 1 to 6 carbon atoms. Examples of the monovalent linear hydrocarbon group having 1 to 6 carbon atoms may include an alkyl group having 1 to 6 carbon atoms. The alkanediyl group for $R_1$ may be linear or branched.

In formula (Sv-2), examples of the divalent hydrocarbon group having 1 to 6 carbon atoms in $Z_1$ may include alkanediyl groups having 1 to 6 carbon atoms and the like.

The monovalent hydrocarbon group having 1 to 6 carbon atoms for $Y_3$ and $Y_4$ may include a monovalent linear hydrocarbon group having 1 to 6 carbon atoms, and a monovalent alicyclic hydrocarbon group having 1 to 6 carbon atoms, and a monovalent aromatic hydrocarbon group having 1 to 6 carbon atoms. Examples of the monovalent linear hydrocarbon group having 1 to 6 carbon atoms may include an alkyl group having 1 to 6 carbon atoms.

Specific examples of the solvent represented by formula (Sv-1) may include ethylene glycol monomethyl ether, ethylene glycol monoethyl ether, ethylene glycol-n-propyl ether, ethylene glycol monoisopropyl ether, ethylene glycol monobutyl ether (butyl cellosolve), ethylene glycol monohexyl ether, ethylene glycol dimethyl ether, ethylene glycol monoacetate, ethylene glycol diacetate, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, propylene glycol monomethyl ether, propylene glycol monoethyl ether, propylene glycol monoethyl ether acetate, propylene glycol monobutyl ether, dipropylene glycol dimethyl ether, dipropylene glycol monomethyl ether, propylene glycol diacetate, ethylene glycol, 1,4-butanediol, 3-methoxybutyl acetate, 3-ethoxybutyl acetate, and the like.

Specific examples of the solvent represented by (Sv-2) may include methyl glycolate, ethyl glycolate, butyl glycolate, ethyl lactate, butyl lactate, isoamyl lactate, ethyl-3-ethoxypropionate, methyl-3-methoxypropionate, ethyl 3-methoxypropionate, 3-ethoxypropionic acid, 3-methoxypropionic acid, propyl 3-methoxypropionate, butyl 3-methoxypropionate, and the like.

The solvent may have a boiling point of 80 to 200° C., more preferably 80 to 180° C. Preferred solvents may include N,N-dimethylformamide, tetramethylurea, 3-methoxy-N,N-dimethylpropanamide, propanol, isopropanol, 3-methyl-3-methoxybutanol, ethyl amyl ketone, methyl ethyl ketone, isoamyl methyl ketone, methyl isopropyl ketone, diisobutyl ketone, cyclohexanone, cyclopentanone, methyl isobutyl ketone, 4-hydroxy-4-methyl-2-pentanone, 4-methyl-2-pentyl acetate, 2-ethylbutyl acetate, cyclohexyl acetate, 2-methylcyclohexyl acetate, butyl butyrate, isoamyl butyrate, diisobutyl carbinol, diisopentyl ether, ethylene glycol monomethyl ether, ethylene glycol monoethyl ether, ethylene glycol-n-propyl ether, ethylene glycol mono isopropyl ether, ethylene glycol monobutyl ether (butyl cellosolve), ethylene glycol dimethyl ether, ethylene glycol monoacetate, ethylene glycol ethyl ether acetate, diethylene glycol dimethyl ether, diethylene glycol diethyl ether, propylene glycol monomethyl ether, propylene glycol monoethyl ether, propylene glycol monoethyl ether acetate, propylene glycol monobutyl ether, dipropylene glycol dimethyl ether, dipropylene glycol monomethyl ether, 3-methoxybutyl acetate, methyl glycolate, ethyl glycolate, butyl glycolate, ethyl lactate, butyl lactate, isoamyl lactate, ethyl-3-ethoxypropionate, methyl-3-methoxypropionate, ethyl 3-methoxypropionate, and the like.

It is preferable that the boiling point is in this range, especially when the liquid crystal aligning agent containing the solvent is coated on a plastic substrate to be described later.

<Other Components>

The liquid crystal aligning agent used in the present invention may comprise components other than the above-mentioned components (A) and (B). Examples of such other components may include, but are not limited to, a crosslinking catalyst, a compound that improves film thickness uniformity and surface smoothness when the liquid crystal alignment agent is applied, a compound that improves the adhesion between the liquid crystal alignment film and the substrate, and the like.

<Crosslinking Catalyst>

A crosslinking catalyst may be added to the liquid crystal aligning agent used in the present invention for the purpose of promoting the reaction between the thermally crosslinkable group and the carboxy group. Examples of such crosslinking catalysts may include sulfonic acids or hydrates or salts thereof such as p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H, 1H, 2H, 2H-perfluorooctanesulfonic acid, perfluoro (2-ethoxyethane)sulfonic acid, pentafluoroethanesulfonic acid, nonafluorobutane-1-sulfonic acids, dodecylbenzenesulfonic acid, and the like. Examples of compounds that generate acid upon heating may include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, N-ethyl-p-toluenesulfonamide and the like.

[Compound that Improves Film Thickness Uniformity and Surface Smoothness]

Examples of the compound for improving uniformity of film thickness and surface smoothness may include fluorine-based surfactants, silicone-based surfactants, and nonionic surfactants.

More specific examples thereof may include EFTOP (registered trademark) 301, EF303, and EF352 (manufactured by MITSUBISHI MATERIAL ELECTRONIC CHEMICALS CO., LTD.), MEGAFACE (registered trademark) F171, F173, and R-30 (manufactured by DIC Corporation), Fluorad FC430 and FC431 (manufactured by 3M Asahi Ltd.), Guard (registered trademark) AG710 (manufactured by AGC Inc.), and Surflon (registered trademark) S-382, SC101, SC102, SC103, SC104, SC105, and SC106 (manufactured by AGC Seimi Chemical Co., Ltd.).

The ratio of these surfactants used may preferably be 0.01 to 2 parts by mass, and more preferably 0.01 to 1 part by mass, with respect to 100 parts by mass of the resin component contained in the polymer composition.

[Compound that Improves Adhesion Between Liquid Crystal Alignment Film and Substrate]

Specific examples of the compound that improves the adhesion between the liquid crystal alignment film and the substrate may include the functional silane-containing compounds described below.

Examples thereof may include amino-based silane-containing compounds such as 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-3-triethoxysilylpropyltriethylenetetramine, N-3-trimethoxysilylpropyltriethylenetetramine, 10-trimethoxysilyl-1,4,7-triazadecane, 10-triethoxysilyl-1,4,7-triazadecane, 9-trimethoxysilyl-3,6-diazononyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, and the like.

When using the compound that improves adhesion to the substrate, the amount used may preferably be 0.1 to 30 parts by mass, more preferably 1 to 20 parts by mass based on 100 parts by mass of the resin component contained in the polymer composition.

In some embodiments, a photosensitizer can also be used as an additive to improve the photoreactivity of the photoalignable group. Specific examples may include aromatic 2-hydroxyketone (benzophenone), coumarin, ketocoumarin, carbonylbiscoumarin, acetophenone, anthraquinone, xanthone, thioxanthone, acetophenone ketal and the like.

<Liquid Crystal Alignment Film and Liquid Crystal Display Element>

The liquid crystal aligning agent according to the present invention can be applied to a substrate, baked, and then subjected to alignment treatment such as rubbing or light irradiation, or without alignment treatment in some vertical alignment applications, to obtain a liquid crystal alignment film. As the substrate, transparent substrate made of: glasses such as float glass and soda glass; or plastics such as polyethylene terephthalate, polybutylene terephthalate, polypropylene, polystyrene, polyether sulfone, polycarbonate, poly(alicyclic olefin), polyvinyl chloride, polyvinylidene chloride, and polyether ether ketone (PEEK) resin films, polysulfone (PSF), polyethersulfone (PES), polyamides, polyimides, acrylic, and triacetyl cellulose, can be used.

The transparent conductive film provided on one surface of the substrate may include a NESA film (registered trademark of PPG, Inc., USA) made of tin oxide ($SnO_2$), an ITO film made of indium oxide-tin oxide ($In_2O_3$—$SnO_2$), and the like, and these can be used as the transparent conductive film.

<Coating Film Formation Process>

The method for applying the liquid crystal aligning agent according to the present invention is not particularly limited, but may include screen printing, flexo printing, offset printing, inkjet, dip coating, roll coating, slit coating, spin coating, and the like, and they may be used depending on the purpose. After coating onto a substrate using the methods, the solvent can be evaporated using heating means such as a hot plate to form a coating film. Furthermore, the coating film from the liquid crystal aligning agent in the step of forming the coating film shows good liquid crystal orientation, even if the content of the (A) component is reduced, since the component (A) is unevenly distributed on the film surface due to the hydrophobicity of the photoalignable group.

The baking after applying the liquid crystal aligning agent may be carried out at any temperature from 40 to 300° C., preferably from 40 to 250° C., more preferably from 40 to 230° C. In the step, the thermally crosslinkable group of the specific compound that is component (A) reacts with the carboxy group of the polyamic acid that is component (B), to fix the orienting group.

The thickness of the coating film formed on the substrate may preferably be 5 to 1,000 nm, more preferably 10 to 500 nm or 10 to 300 nm. The baking step can be carried out using a hot plate, hot air circulation furnace, infrared furnace, and the like.

<Light Irradiation Process>

In some embodiments, an alignment treatment by light irradiation may be carried out. For example, the method comprises a step of applying the above-mentioned liquid crystal aligning agent onto a substrate to form a coating film, and a step of irradiating the coating film with light in a state where the coating film is not in contact with or in contact with the liquid crystal layer.

Examples of the light irradiated in the alignment treatment by light irradiation may include ultraviolet rays containing light with a wavelength of 150 to 800 nm, visible light, and the like. Among them, ultraviolet light containing light with a wavelength of 300 to 400 nm is preferable. The irradiation light may be polarized or non-polarized. As the polarized light, it is preferable to use light containing linearly polarized light.

When the light used is polarized light, the light irradiation may be performed from a direction perpendicular, or oblique, or a combination thereof to the substrate surface. When irradiating non-polarized light, it is preferable to irradiate from a direction oblique to the substrate surface.

The amount of light irradiation may preferably be 0.1 $mJ/cm^2$ or more and less than 1,000 $mJ/cm^2$, more preferably 1 to 500 $mJ/cm^2$, and even more preferably 2 to 200 $mJ/cm^2$.

The liquid crystal display element according to the present invention can be manufactured by a normal method, and the manufacturing method is not particularly limited. It is preferable that the pair of substrates face each other with an appropriate gap therebetween, and that a spacer is disposed between the substrates in order to make the thickness of the liquid crystal sandwiched between the substrates uniform. As the spacer, known spacer materials such as a conventional scattering type spacer and a spacer formed from a photosensitive spacer forming composition as well as unevenness formed on a layer made of a cured liquid crystal material can be used.

<Liquid Crystal Clamping Process>

For constructing a liquid crystal cell by sandwiching a liquid crystal between substrates, there are, for example, the following two methods. The first method for producing a liquid crystal cell comprises the steps of: placing a pair of substrates facing each other with a gap (cell gap) so that the respective liquid crystal alignment films face each other, bonding the peripheral parts of the pair of substrates together using a sealant, injecting liquid crystal into a cell gap defined by a suitable sealant, and sealing the injection hole, to produce a liquid crystal cell.

As a second method, the method comprising the following steps can be mentioned: the steps of applying, for example, an ultraviolet light curable sealant to a predetermined location on one of the two substrates each on which a liquid crystal alignment film is formed, dropping the liquid crystal onto a predetermined number of locations on the surface of the liquid crystal alignment film, attaching another substrate so that the liquid crystal alignment films face each other, spreading the liquid crystal over the entire surface of the substrate, and irradiating ultraviolet light to the entire surface of the substrate, and curing the sealant, to produce a liquid crystal cell (ODF (One Drop Fill) method).

As the liquid crystals, fluorine-based liquid crystals and cyano-based liquid crystals that have positive or negative dielectric anisotropy depending on the application, and liquid crystal compounds or liquid crystal compositions that are polymerized by at least one of heating and light irradiation (hereinafter also referred to as a polymerizable liquid crystal or a curable liquid crystal composition) may be used.

In some embodiments, the step of forming the coating film of the liquid crystal aligning agent may be carried out by a roll-to-roll method. When the roll-to-roll method is used, it becomes possible to simplify the manufacturing process of the liquid crystal display element and reduce the manufacturing cost.

A liquid crystal display element can be obtained by attaching polarizing plates to both outer surfaces of the liquid crystal cell.

The polarizing plate used on the outside of the liquid crystal cell may be a polarizing plate in which a polarizing film called "H film", which is made by stretching and aligning polyvinyl alcohol and absorbing iodine, is sandwiched between cellulose acetate protective films, or a polarizing plate consisting of the H film itself.

The liquid crystal alignment film obtained from the liquid crystal aligning agent according to the present invention as described above has good liquid crystal orientation, excellent pretilt angle expression ability, and high reliability. Further, the liquid crystal display element manufactured by the method according to the present invention has excellent display characteristics.

EXAMPLES

The present invention will be described in more detail by, but not limited to, following Examples. The abbreviations of the compounds used are as follows:

(Photoalignable Monomer)

EP1 to EP5: Compounds represented by the following formulas [EP1] to [EP5], respectively. Furthermore, in the formulas (EP1) to (EP5), "t" represents trans-type of the cyclohexyl group.

<Tetracarboxylic Dianhydride>

A1 and A2: Compounds represented by the following formulas [A1] and [A2], respectively:

A1

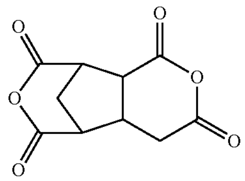

A2

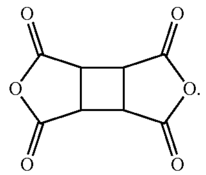

<Side Chain Diamine>

B1 and B2: Compounds represented by the following formulas [B1] and [B2], respectively:

B1

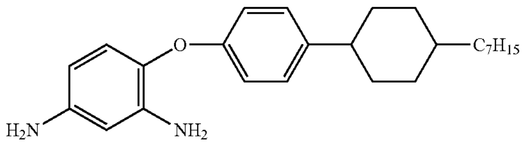

(EP1)

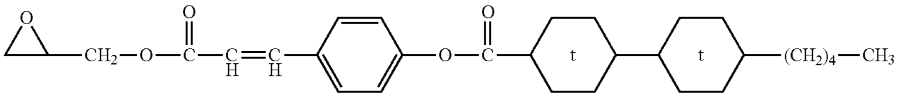

(EP2)

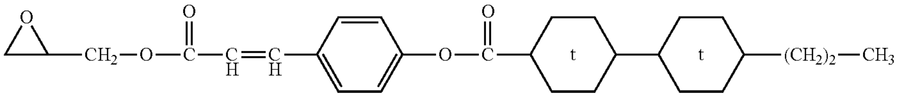

(EP3)

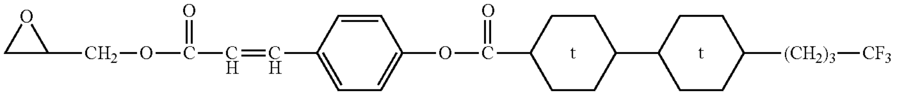

(EP4)

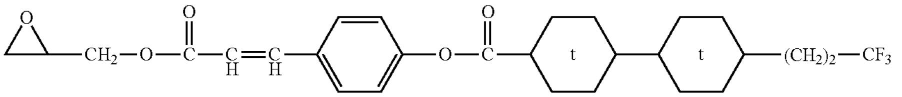

(EP5)

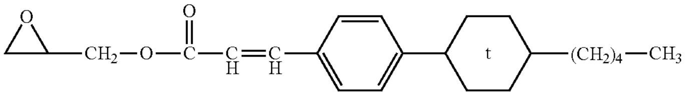

-continued

B2

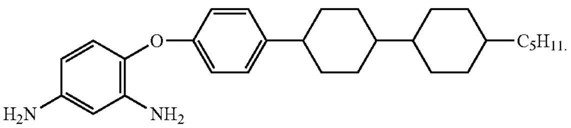

<Other Diamines>

C1 and C2: Compounds represented by the following formulas [C1] and [C2], respectively:

C1

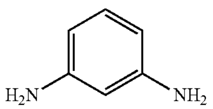

C2

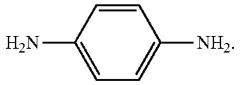

In addition, the abbreviations of reagents used in the present example are shown below:

(Solvent)

$CH_2Cl_2$: Methylene chloride
THF: Tetrahydrofuran
MeOH: Methanol
EtOH: Ethanol
AcOEt: Ethyl acetate
MeCN: Acetonitrile
$CHCl_3$: Chloroform
NMP: N-Methyl-2-pyrrolidone
BCS: Butyl cellosolve.

<Synthesis of Monomer>

EP5 was synthesized by the method described in Japanese Patent Application Publication No. 2011-133825. EP1 to EP4 are new compounds that have not been published in literature, and their synthesis methods will be detailed in Monomer Synthesis Examples 1 to 4 below.

<$^1$H-NMR Measurement>

Equipment: Fourier transform superconducting nuclear magnetic resonance apparatus (FT-NMR) "AVANCE III" (manufactured by BRUKER) 500 MHZ.

Solvent: Deuterated dimethyl sulfoxide (DMSO-$d_6$), deuterated chloroform ($CDCl_3$).

Standard material: Tetramethylsilane (TMS).

Monomer Synthesis Example 1: Synthesis of [EP1]

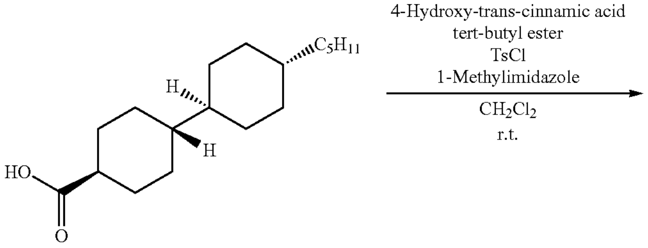

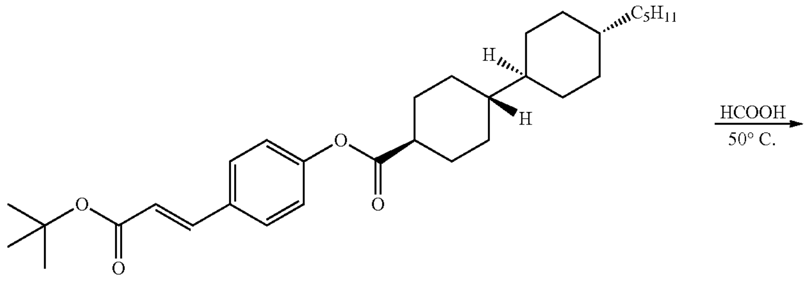

EP1-1

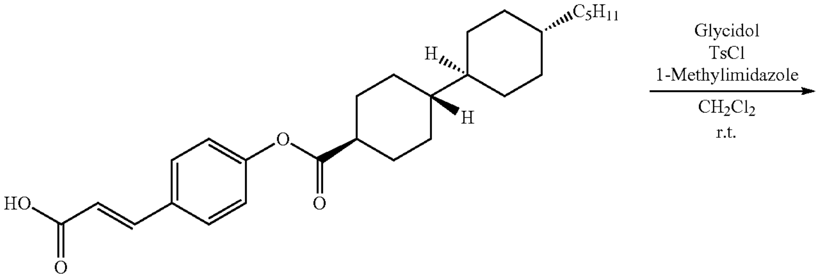

EP1-2

-continued

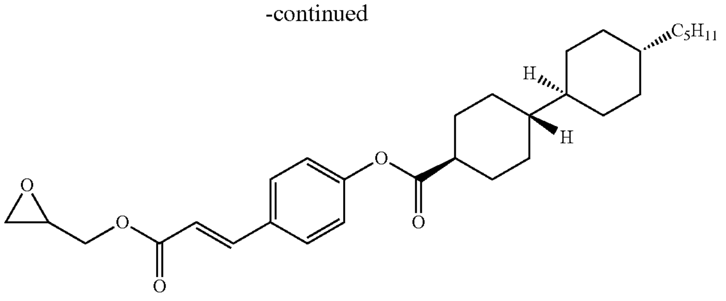

EP1

Into a 300 mL four-neck flask, trans, trans-4'-pentylbicyclohexyl-4-carboxylic acid (11.2 g, 40.0 mmol), p-toluenesulfonyl chloride (9.2 g, 48.0 mmol), and $CH_2Cl_2$ (110 g) was charged, 1-methylimidazole (9.9 g, 120 mmol) was added dropwise in an ice bath, and the mixture was stirred at room temperature (25° C.) for 3 hours. Subsequently, 4-hydroxy-trans-cinnamic acid tert-butyl ester (8.8 g, 40.0 mmol) dissolved in $CH_2Cl_2$ (56 g) in an ice bath was added dropwise, and stirred at room temperature. After the reaction was completed, the reaction solution was concentrated, THE (30 g) was added to the residue, and the mixture was poured into pure water (90 g) to separate the precipitate by filtration. After adding MeOH (100 g) to the resulting crude material and repulp washing at room temperature, AcOEt (100 g) was further added to the crude material and repulping washing was carried out at 0° C., to obtain [EP1-1] (17.1 g, 35.4 mmol, yield: 89%).

Into a 500 mL four-neck flask, [EP1-1] (17.1 g, 35.4 mmol) and formic acid (260 g) were charged, and stirred at 0° C. After the reaction was completed, the reaction solution was poured into pure water (1500 g) to separate the precipitate by filtration. To the resulting crude, MeCN (300 g) was added, repulp washing was carried out at the room temperature, to obtain [EP1-2] (14.8 g, 34.7 mmol, yield: 98%).

Into a 500 mL four-neck flask, [EP1-2] (14.8 g, 34.7 mmol), p-toluenesulfonyl chloride (7.9 g, 42.0 mmol), and $CH_2Cl_2$ (150 g) were charged. Thereto, 1-methylimidazole (8.5 g, 104 mmol) was added dropwise in an ice bath, and the mixture was stirred at room temperature for 3 hours. Subsequently, glycidol (2.8 g, 38.0 mmol) dissolved in $CH_2Cl_2$ (74 g) in an ice bath was added dropwise, and stirred at room temperature. After the reaction was completed, the reaction solution was concentrated, THF (50 g) was added to the residue, and the mixture was poured into pure water (500 g) to separate the precipitate by filtration. Subsequently, the resulting crude product was isolated by silica gel column chromatography (AcOEt:Heptane=1:10 (volume ratio)), to obtain the target [EP1] (white solid) (5.1 g, 10.5 mmol, yield: 30%). The results of 1H-NMR of the target product are shown below. The results confirmed that the resulting solid was the desired [EP1].

$^1$H-NMR (500 MHZ, $CDCl_3$): δ (ppm=) 7.69-7.72 (d, 1H), 7.53-7.55 (d, 2H), 7.09-7.11 (d, 2H), 6.41-6.44 (d, 1H), 4.53-4.56 (m, 1H), 4.04-4.07 (m, 1H), 3.28-3.30 (m, 1H), 2.88-2.90 (t, 1H), 2.70-2.71 (m, 1H), 2.45-2.49 (m, 1H), 2.14-2.16 (d, 2H), 1.85-1.87 (d, 2H), 1.71-1.78 (m, 4H), 1.50-1.57 (m, 2H), 1.22-1.32 (m, 6H), 0.95-1.17 (m, 9H), 0.84-0.90 (m, 5H).

Monomer Synthesis Example 2: Synthesis of [EP2]

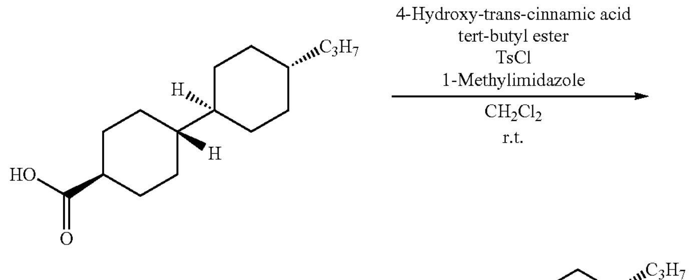

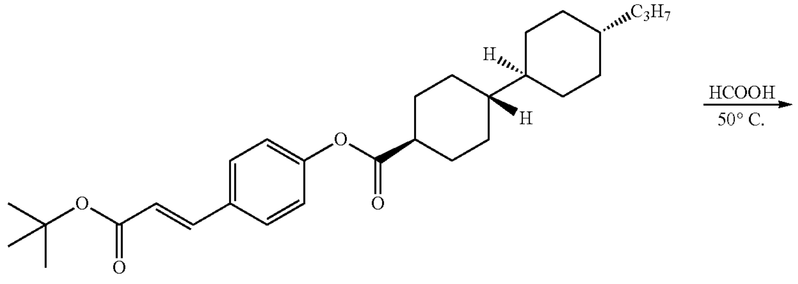

EP2-1

-continued

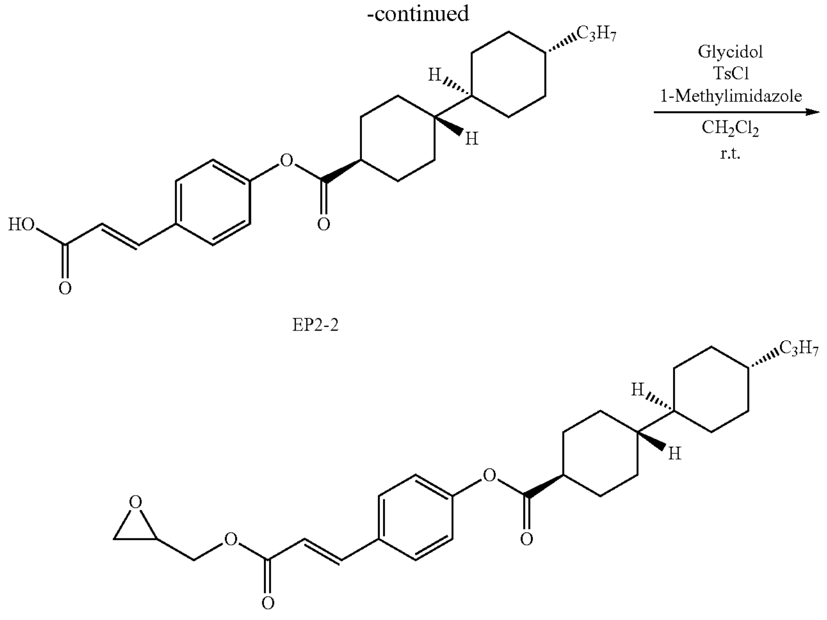

EP2-2

EP2

Into 300 mL four-necked flask, trans, trans-4'-propylbicyclohexyl-4-carboxylic acid (10.1 g, 40.0 mmol), p-toluenesulfonyl chloride (9.2 g, 48.0 mmol), and $CH_2Cl_2$ (101 g) were charged, 1-methylimidazole (9.9 g, 120 mmol) was added dropwise in an ice bath, and the mixture was stirred at room temperature for 3 hours. Subsequently, 4-hydroxy-trans-cinnamic acid tert-butyl ester (8.8 g, 40.0 mmol) dissolved in $CH_2Cl_2$ (51 g) in an ice bath was added dropwise, and stirred at room temperature. After the reaction was completed, the reaction solution was concentrated, THF (30 g) was added to the residue, and the mixture was poured into pure water (90 g) to separate the precipitate by filtration. After adding MeOH (100 g) to the resulting crude material and performing repulp washing at room temperature, AcOEt (100 g) was further added to the crude material, and repulping washing was carried out at 0° C., to obtain [EP2-1] (16.6 g, 36.6 mmol, yield: 92%).

Into a 500 mL four-necked flask, [EP2-1] (16.6 g, 36.6 mmol) and formic acid (250 g) were charged, and stirred at 50° C. After the reaction was completed, the reaction solution was poured into pure water (1500 g), to separate the precipitate by filtration. To the resulting crude product, MeCN (150 g) was added, and it was repulped and washed at room temperature, to obtain [EP2-2] (14.4 g, 36.2 mmol, yield: 99%).

Into a 500 mL four-neck flask, [EP2-2] (14.1 g, 35.3 mmol), p-toluenesulfonyl chloride (8.1 g, 42.0 mmol), and $CH_2Cl_2$ (140 g) were charged. Thereto, 1-methylimidazole (8.7 g, 106.0 mmol) was added dropwise in an ice bath, and the mixture was stirred at room temperature for 3 hours. Subsequently, glycidol (2.9 g, 39.0 mmol) dissolved in $CH_2Cl_2$ (70 g) in an ice bath was added dropwise, and stirred at room temperature. After the reaction was completed, the reaction solution was concentrated, THF (50 g) was added to the residue, and the mixture was poured into pure water (500 g) to separate the precipitate by filtration. Subsequently, the resulting crude product was isolated by silica gel column chromatography (AcOEt:Heptane=1:10 (volume ratio)) to obtain the target [EP2] (white solid) (8.5 g, 18.6 mmol, yield: 53%). The results of 1H-NMR of the target product are shown below. The results confirmed that the resulting solid was the target [EP2].

$^1$H-NMR (500 MHz, $CDCl_3$): δ (ppm=) 7.69-7.72 (d, 1H), 7.53-7.55 (d, 2H), 7.09-7.11 (d, 2H), 6.41-6.44 (d, 1H), 4.53-4.56 (m, 1H), 4.04-4.07 (m, 1H), 3.29-3.29 (m, 1H), 2.88-2.90 (t, 1H), 2.69-2.71 (m, 1H), 2.44-2.48 (m, 1H), 2.14-2.16 (d, 2H), 1.85-1.87 (d, 2H), 1.71-1.78 (m, 4H), 1.50-1.56 (m, 2H), 1.27-1.33 (m, 2H), 0.95-1.16 (m, 9H), 0.84-0.89 (m, 5H).

Monomer Synthesis Example 3: Synthesis of [EP3]

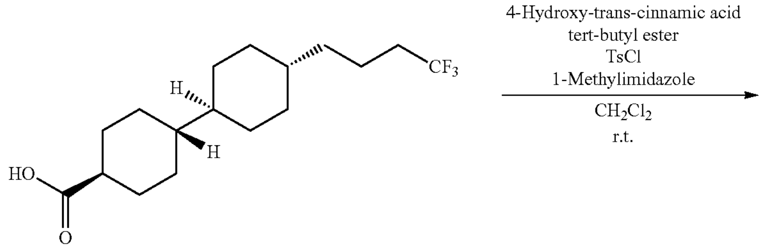

-continued

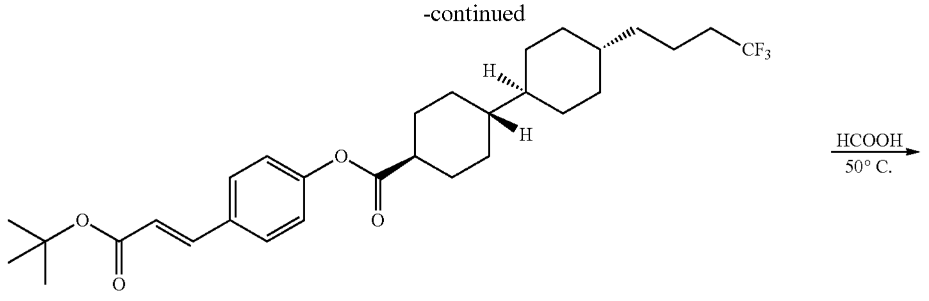

EP3-1

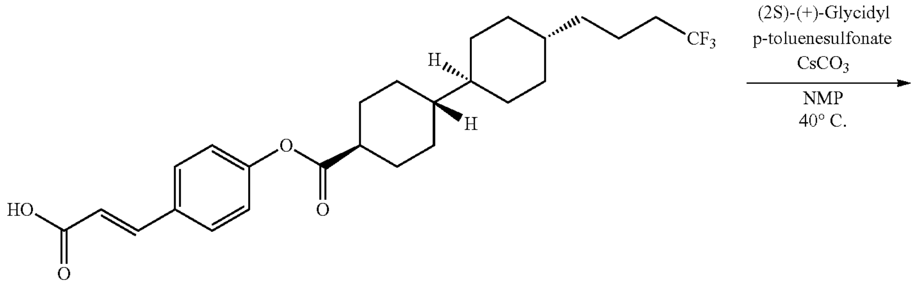

EP3-2

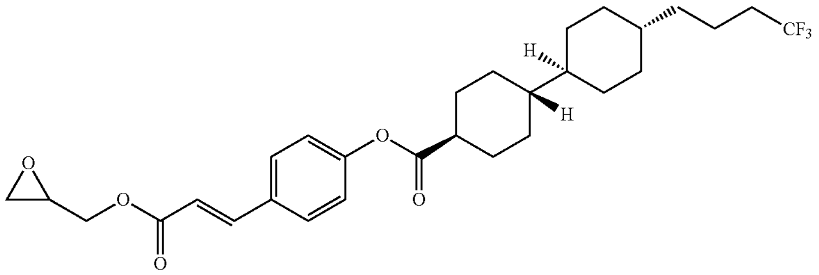

EP3

Into a 1 L four-necked flask, trans, trans-4'-(4,4,4-trifluorobutyl) [1,1'-bicyclohexyl]-4-carboxylic acid (30.0 g, 94.0 mmol), p-toluenesulfonyl chloride (21.4 g, 112 mmol) and $CH_2Cl_2$ (300 g) were charged, and 1-methylimidazole (23.1 g, 281.0 mmol) was added dropwise in an ice bath, followed by stirring at room temperature for 3 hours. Subsequently, 4-hydroxy-trans-cinnamic acid tert-butyl ester (22.7 g, 103 mmol) dissolved in $CH_2Cl_2$ (150 g) in an ice bath was added dropwise thereto, and stirred at room temperature. After the reaction was completed, the reaction solution was concentrated, THF (150 g) was added to the residue, and the mixture was poured into pure water (1000 g) to separate the precipitate by filtration. To the resulting crude material, AcOEt (200 g) was added, and repulp washing was carried out at 0° C., to obtain [EP3-1] (46.5 g, 88.9 mmol, yield: 95%).

Into a 2 L four-necked flask, [EP3-1] (46.5 g, 88.9 mmol) and formic acid (700 g) were charged, and stirred at 50° C. After the reaction was completed, the reaction solution was poured into pure water (2000 g), to separate the precipitate by filtration. To the resulting crude product, MeCN (300 g) was added, and repulped and washed at room temperature, to obtain [EP3-2] (41.3 g, 88.6 mmol, yield: 99%).

Into a 300 mL four-necked flask, [EP3-2] (10.0 g, 21.4 mmol), (2S)-(+)-glycidyl tosylate (5.4 g, 23.6 mmol), cesium carbonate (8.4 g, 25.7 mmol) and NMP (100 g) were charged, and stirred at 40° C. After the reaction was completed, the reaction solution was poured into pure water (600 g), made weakly acidic using a 1N aqueous hydrochloric acid solution, to separate the precipitate by filtration. To the resulting crude material, MeOH (300 g) was added, and repulp washing was carried out at room temperature. Subsequently, the resulting crude product was isolated by silica gel column chromatography ($CHCl_3$:MeCN=100:1 (volume ratio)), to obtain the target [EP3] (white solid) (5.3 g, 10.1 mmol, yield: 48%). The results of 1H-NMR of the target product are shown below. The results confirmed that the resulting solid was the target [EP3].

$^1$H-NMR (500 MHZ, $CDCl_3$): δ (ppm=) 7.69-7.72 (d, 1H), 7.53-7.55 (d, 2H), 7.09-7.11 (d, 2H), 6.41-6.44 (d, 1H), 4.54-4.57 (m, 1H), 4.03-4.07 (m, 1H), 3.28-3.30 (m, 1H), 2.88-2.90 (t, 1H), 2.70-2.71 (m, 1H), 2.44-2.49 (m, 1H), 2.14-2.17 (d, 2H), 2.01-2.07 (m, 2H), 1.85-1.87 (d, 2H), 1.73-1.79 (m, 4H), 1.52-1.58 (m, 4H), 1.22-1.26 (m, 2H), 0.96-1.18 (m, 7H), 0.85-0.92 (m, 2H).

Monomer Synthesis Example 4: Synthesis of [EP4]

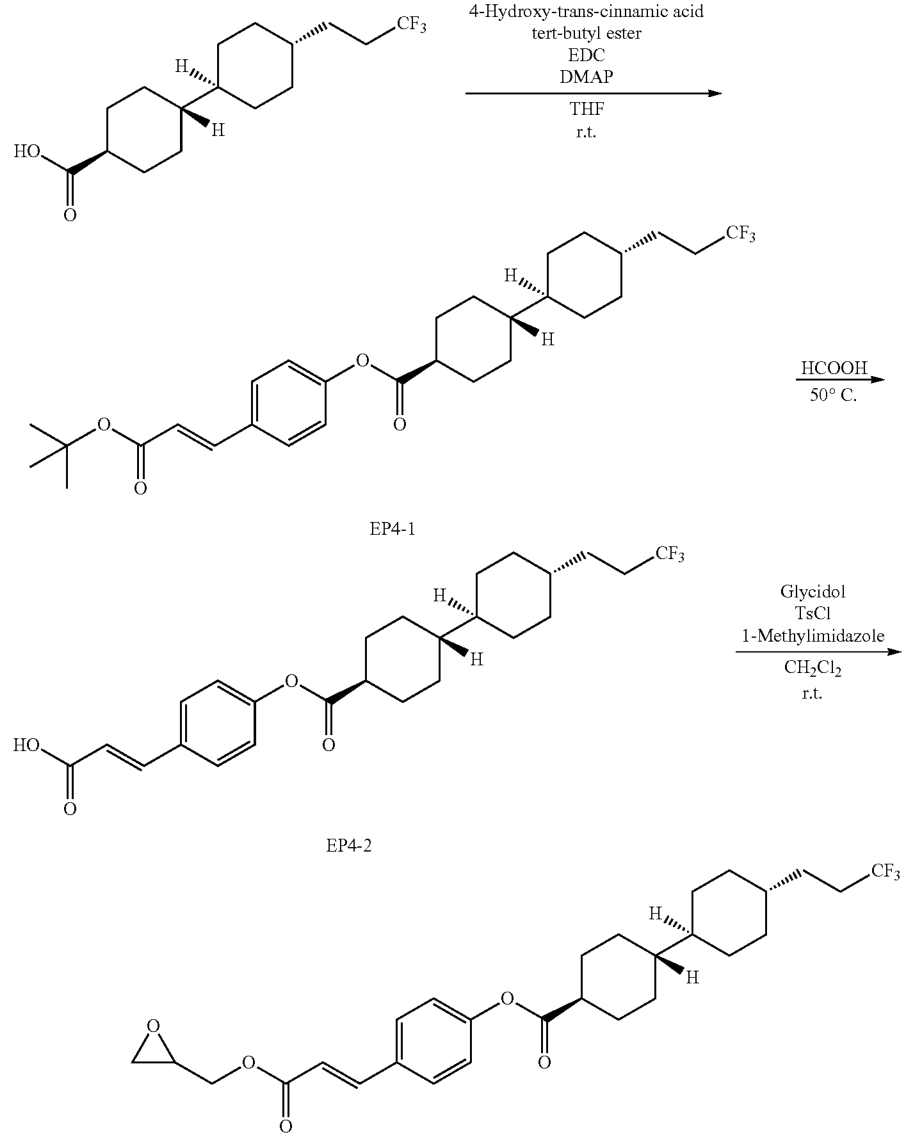

EP4-1

EP4-2

EP4

Into a 200 mL four-necked flask, trans, trans-4'-(4,4,4-trifluoropropyl) [1,1'-bicyclohexyl]-4-carboxylic acid (9.2 g, 30.0 mmol), 4-hydroxy-trans-cinnamic acid tert-butyl ester (6.6 g, 30.0 mmol), 1-(3-dimethylaminopropyl)-3-ethylcarbodiimide hydrochloride (8.6 g, 45.0 mmol), 4-dimethylaminopyridine (0.4 g, 3.0 mmol) and THF (92 g) were charged, and stirred at room temperature. After the reaction was completed, the reaction solution was poured into pure water (1500 g), to separate the precipitate by filtration. To the resulting crude product, MeOH (300 g) was added, and repulp washing was carried out at room temperature, to obtain [EP4-1] (13.7 g, 26.9 mmol, yield: 90%).

Into a 1 L four-necked flask, [EP4-1] (13.7 g, 26.9 mmol) and formic acid (205 g) were charged, and stirred at 50° C. After the reaction was completed, the reaction solution was poured into pure water (1000 g), to separate the precipitate by filtration. To the resulting crude product, MeCN (300 g) was added, and it was repulped and washed at room temperature, to obtain [EP4-2] (11.9 g, 26.2 mmol, yield: 98%).

Into a 200 mL four-neck flask, [EP4-2] (6.0 g, 13.3 mmol), p-toluenesulfonyl chloride (3.0 g, 15.9 mmol), and $CH_2Cl_2$ (60 g) were charged. Thereto, 1-methylimidazole (3.3 g, 40.0 mmol) was added dropwise in an ice bath, and the mixture was stirred at room temperature for 3 hours. Subsequently, glycidol (1.1 g, 14.6 mmol) dissolved in $CH_2Cl_2$ (30 g) in an ice bath was added dropwise, and stirred at room temperature. After the reaction was completed, the reaction solution was concentrated, AcOEt (600 g) was added to the residue, and the organic layer was washed with pure water (1200 g) and concentrated. Subsequently, AcOEt (30 g) and EtOH (150) were added to the resulting crude product, followed by repulping and washing at 0° C., to obtain the target [EP4] (white solid) (3.1 g, 6.0 mmol, yield: 45%). The results of 1H-NMR of the target product are shown below. The results confirmed that the resulting solid was the target [EP4].

$^1$H-NMR (500 MHZ, $CDCl_3$): δ (ppm=) 7.69-7.72 (d, 1H), 7.53-7.55 (d, 2H), 7.09-7.11 (d, 2H), 6.41-6.44 (d, 1H), 4.54-4.57 (m, 1H), 4.03-4.07 (m, 1H), 3.28-3.30 (m, 1H), 2.88-2.90 (t, 1H), 2.70-2.71 (m, 1H), 2.44-2.49 (m, 1H), 2.15-2.17 (d, 2H), 2.05-2.10 (m, 2H), 1.85-1.87 (d, 2H), 1.75-1.79 (m, 4H), 1.52-1.57 (m, 2H), 1.42-1.50 (m, 2H), 1.20-1.22 (m, 1H), 0.88-1.14 (m, 8H)

Synthesis of Polyamic Acid

Synthesis Example 1

C1 (2.16 g, 20.00 mmol) and A1 (4.35 g, 19.4 mmol) were dissolved in NMP (26.2 g), and reacted at 60° C. for 10 hours, to give a polyamic acid solution (PAA-1A) having a solid concentration of 20% by mass.

To the resulting polyamic acid solution (PAA-1A) (10.0 g), NMP (20.0 g) and BCS (20.0 g) were added, and stirred at room temperature for 2 hours, to obtain a polyamic acid solution (PAA-1) having 4% by mass of the solid content concentration.

Synthesis Examples 2 to 3

Polyamic acid solutions (PAA-2)) to (PAA-3) were synthesized with the compositions shown in Table 1 in a manner similar to the process described in Synthesis Example 1.

TABLE 1

| No. | Polymer Component | Acid dianhydride (19.40 mmol) | Other diamine (20.00 mmol) |
|---|---|---|---|
| Synthesis Ex 1 | PAA-1 | A1 | C1 |
| Synthesis Ex 2 | PAA-2 | A1 | C2 |
| Synthesis Ex 3 | PAA-3 | A2 | C1 |

Synthesis Example 4

B1 (0.76 g, 2.00 mmol), C1 (1.95 g, 18.00 mmol), and A1 (4.35 g, 19.4 mmol) were dissolved in NMP (28.2 g), and the reaction was carried out at 60° C. for 10 hours, to obtain a polyamic acid solution (PAA-4A) having a solid content concentration of 20% by mass.

To the resulting polyamic acid solution (PAA-4A) (10.0 g), NMP (20.0 g) and BCS (20.0 g) were added, and stirred at room temperature for 2 hours, to obtain a polyamic acid solution (PAA-4) having 4% by mass of the solid content concentration.

Synthesis Example 5

A polyamic acid solution (PAA-5) was synthesized with the composition shown in Table 2 in a manner similar to the method described in Synthesis Example 4.

TABLE 2

| No. | Polymer Component | Acid dianhydride (19.40 mmol) | Side-chain diamine (2.00 mmol) | Other diamine (18.00 mmol) |
|---|---|---|---|---|
| Synthesis Ex 4 | PAA-4 | A1 | B1 | C1 |

TABLE 2-continued

| No. | Polymer Component | Acid dianhydride (19.40 mmol) | Side-chain diamine (2.00 mmol) | Other diamine (18.00 mmol) |
|---|---|---|---|---|
| Synthesis Ex 5 | PAA-5 | A1 | B2 | C1 |

Preparation of Liquid Crystal Alignment Agent

Example 1

To the polyamic acid solution (PAA-1) (50.0 g) obtained in Synthesis Example 1A, EP1 (0.03 g) was added, and stirred at room temperature, to obtain a liquid crystal aligning agent (AL-1).

Examples 2 to 5

As shown in Table 3, liquid crystal alignment agents (AL-2) to (AL-5) were obtained by carrying out the procedures similar to Example 1, except that polyamic acid solutions (PAA-2) to (PAA-5) were used instead of polyamic acid solution (PAA-1).

Examples 6 to 8

As shown in Table 3, liquid crystal alignment agents (AL-6) to (AL-8) were obtained by carrying out the procedures similar to Example 1, except that the photo-alignable monomers (EP2) to (EP4) were used instead of the photo-alignable monomer (EP1).

TABLE 3

| No. | Liquid crystal alignment agent | Polyamic acid solution (50.00 g) | Photo-alignable monomer (0.03 g) |
|---|---|---|---|
| Ex. 1 | AL-1 | PAA-1 | EP1 |
| Ex. 2 | AL-2 | PAA-2 | EP1 |
| Ex. 3 | AL-3 | PAA-3 | EP1 |
| Ex. 4 | AL-4 | PAA-4 | EP1 |
| Ex. 5 | AL-5 | PAA-5 | EP1 |
| Ex. 6 | AL-6 | PAA-1 | EP2 |
| Ex. 7 | AL-7 | PAA-1 | EP3 |
| Ex. 8 | AL-8 | PAA-1 | EP4 |

Comparative Example 1

To the polyamic acid solution (PAA-1) (10.0 g) obtained in Synthesis Example 1A, EP5 (0.06 g) was added, and stirred at room temperature, to obtain a liquid crystal aligning agent (AL-R1).

Comparative Examples 2 to 5

As shown in Table 4, the procedure was carried out in a manner similar to that in Comparative Example 1, except that (PAA-2) to (PAA-5) were used instead of polyamic acid solution (PAA-1), to obtain liquid crystal alignment agents (AL-R2) to (AL-R5).

TABLE 4

| No. | Liquid crystal alignment agent | Polyamic acid solution (10.00 g) | Photo-alignable monomer (0.06 g) |
|---|---|---|---|
| Comp. Ex. 1 | AL-R1 | PAA-1 | EP5 |
| Comp. Ex. 2 | AL-R2 | PAA-2 | EP5 |
| Comp. Ex. 3 | AL-R3 | PAA-3 | EP5 |
| Comp. Ex. 4 | AL-R4 | PAA-4 | EP5 |
| Comp. Ex. 5 | AL-R5 | PAA-5 | EP5 |

<Production of Liquid Crystal Display Element>

The liquid crystal aligning agents (AL-1) to (AL-8) obtained in the examples and the liquid crystal aligning agents (AL-R1) to (AL-R5) obtained in the comparative examples were filtered under pressure using a membrane filter having a pore diameter of 1 μm.

The resulting solution was spin coated on the ITO surface of a glass substrate with a transparent electrode made of an ITO film, dried on a hot plate at 70° C. for 90 seconds, and then baked on a hot plate at 200° C. for 30 minutes, to form a liquid crystal alignment film with a thickness of 100 nm.

Then, the coating surface was irradiated with 50 mJ/cm$^2$ of linearly polarized ultraviolet light with a wavelength of 313 nm and an irradiation intensity of 4.3 mW/cm$^2$ through a polarizing plate from an angle inclined at 40° from the normal direction of the substrate, to form a substrate having a liquid crystal alignment film. Linearly polarized ultraviolet light was prepared by passing ultraviolet light from a high-pressure mercury lamp through a bandpass filter with a wavelength of 313 nm, and then passing it through a polarizing plate with a wavelength of 313 nm.

Two of the above substrates were prepared, and after 4 μm bead spacers were sprinkled on the liquid crystal alignment film of one substrate, a sealant (manufactured by Mitsui Chemicals, Inc., XN-1500T) was applied. Then, the other substrate was attached so that the liquid crystal alignment film surfaces faced each other and the orientation direction was 180°, and then the sealant was thermally cured at 120° C. for 90 minutes, to prepare an empty cell. A liquid crystal (MLC-3022, manufactured by Merck & Co., Ltd.) was injected into the empty cell by a reduced pressure injection method to obtain a liquid crystal display element.

<Evaluation>

(Liquid Crystal Orientation)

The liquid crystal display element obtained above was subjected to isotropic phase treatment at 120° C. for 1 hour, and then the cell was observed using a polarizing microscope. As an evaluation criterion, a case where there was no alignment defect such as light leakage or domain generation, and uniform liquid crystal driving was obtained when a voltage was applied to the liquid crystal cell, was evaluated as "good". The evaluation results are shown in Table 5.

(Pretilt Angle)

The pretilt angle of the liquid crystal cell was measured by the Mueller matrix method using AxoScan manufactured by Axometrics. The evaluation results are shown in Table 5.

(Evaluation of Pretilt Angle Change)

A DC voltage of 15 V was applied to the liquid crystal display element whose pretilt angle was measured above, and the pretilt angle was measured again 24 hours later. The amount of change in pretilt angle ($\Delta_{pretilt}$) was determined from the pretilt angle before and after applying the DC voltage. The evaluation results are shown in Table 5.

TABLE 5

| No. | Liquid crystal alignment agent | Liquid crystal orientation | Tilt angle (°) | $\Delta_{pretilt}$ (°) |
|---|---|---|---|---|
| Ex. 1 | AL-1 | Good | 88 | 0.02 |
| Ex. 2 | AL-2 | Good | 88 | 0.02 |
| Ex. 3 | AL-3 | Good | 87.9 | 0.02 |
| Ex. 4 | AL-4 | Good | 89 | 0.01 |
| Ex. 5 | AL-5 | Good | 89.1 | 0.01 |
| Ex. 7 | AL-7 | Good | 87.9 | 0.02 |
| Comp. Ex. 1 | AL-R1 | Good | 88 | 0.06 |
| Comp. Ex. 2 | AL-R2 | Good | 88 | 0.07 |
| Comp. Ex. 3 | AL-R3 | Good | 87.9 | 0.07 |
| Comp. Ex. 4 | AL-R4 | Good | 89 | 0.04 |
| Comp. Ex. 5 | AL-R5 | Good | 89.1 | 0.04 |

Table 5 shows that the liquid crystal alignment film obtained from the liquid crystal alignment agent in which specific compounds EP1 to EP4 were added to polyamic acid had higher tilt stability than the liquid crystal alignment film of the comparative example, specifically, in comparison of Examples 1 and 7 with Comparative Example 1, in comparison of Example 2 with Comparative Example 2, in comparison of Example 3 with Comparative Example 3, in comparison of Example 4 with Comparative Example 4, and in comparison of Example 5 with Comparative Example 5.

INDUSTRIAL APPLICABILITY

A liquid crystal display element using the liquid crystal alignment agent according to the present invention and a liquid crystal alignment film obtained therefrom can be suitably used for a liquid crystal display element that requires durability, such as for use in a vehicle.

What is claimed is:

1. A compound represented by any one of the following formulas (paa-1-ma1) to (paa-1-ma4):

(paa-1-ma1)

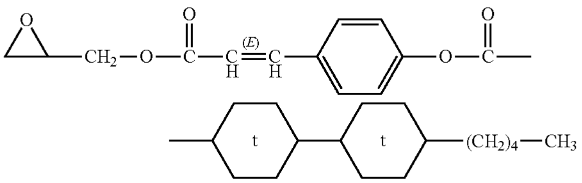

(paa-1-ma2)

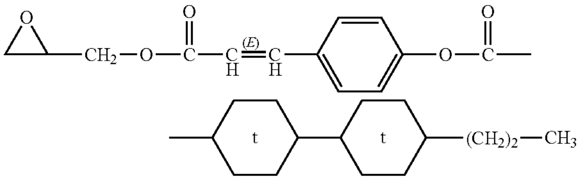

-continued
(paa-1-ma3)
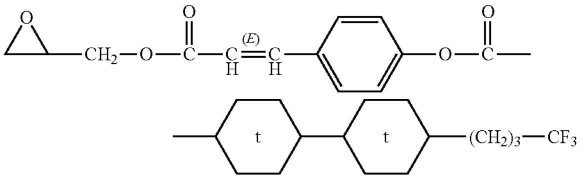
(paa-1-ma4)
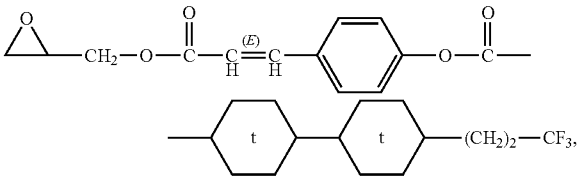
wherein (E) in the formulas (paa-1-ma1), (paa-1-ma2), (paa-1-ma3) and (paa-1-ma4) each represents the E form, and t in the formulas (paa-1-ma1), (paa-1-ma2), (paa-1-ma3) and (paa-1-ma4) each represents the trans form of the cyclohexyl group.
* * * * *